United States Patent
Marion

(10) Patent No.: US 8,170,697 B2
(45) Date of Patent: May 1, 2012

(54) SYSTEM AND METHOD FOR REPAIRING AND RE-ALIGNING DAMAGED VEHICLE BODY AND FRAME STRUCTURES

(76) Inventor: Gregory E. Marion, St. Paul Park, MN (US)

( * ) Notice: Subject to any disclaimer, the term of this patent is extended or adjusted under 35 U.S.C. 154(b) by 441 days.

(21) Appl. No.: 12/381,365

(22) Filed: Mar. 11, 2009

(65) Prior Publication Data

US 2009/0234480 A1 Sep. 17, 2009

Related U.S. Application Data

(60) Provisional application No. 61/069,110, filed on Mar. 12, 2008.

(51) Int. Cl.
*G06F 19/00* (2011.01)
(52) U.S. Cl. .......................... 700/57; 700/192
(58) Field of Classification Search ............ 700/57, 700/98, 192, 193, 195; 33/600, 608; 72/447; 29/402.01; 702/152, 150.53
See application file for complete search history.

(56) References Cited

U.S. PATENT DOCUMENTS

| | | | | |
|---|---|---|---|---|
| 4,982,595 A | * | 1/1991 | Fiorese | 72/447 |
| 5,341,575 A | * | 8/1994 | Chisum | 33/608 |
| 5,357,777 A | * | 10/1994 | Castellano | 72/305 |
| 5,661,995 A | * | 9/1997 | Fagerdahl | 72/457 |
| 6,775,639 B1 | * | 8/2004 | Mason | 702/152 |
| 7,324,966 B2 | * | 1/2008 | Scheer | 705/28 |
| 7,502,772 B2 | * | 3/2009 | Kidd et al. | 706/48 |
| 7,530,152 B2 | * | 5/2009 | Giarrizzo, Jr. | 29/402.08 |
| 2005/0131586 A1 | * | 6/2005 | Srack et al. | 701/1 |
| 2008/0072444 A1 | * | 3/2008 | Harrill et al. | 33/600 |

\* cited by examiner

*Primary Examiner* — Kidest Bahta
(74) *Attorney, Agent, or Firm* — Charles A. Johnson

(57) ABSTRACT

Systems and methods for evaluating damage to a vehicle and controlling a vehicle repair process to bring all aspects of the damaged vehicle back within manufacturer's specification during repair. Processes for evaluating, measuring and repairing specified reference points on a vehicle are described. The processes include an incremental examination and repair of affiliated reference points to bring them back into specified positions with respect to a datum, each other and the centerline of the vehicle. The processes also include the determinations of the three-dimensional dislocations of reference points from their specified positions and make a three-dimensional determination of a force vector to direct the application of force to return each reference point to its specified position. A computer system implementing the vehicle control processes provides automated or semi-automated systems of vehicle repair.

23 Claims, 17 Drawing Sheets

PERIMETER-TYPE FRAME

LADDER-TYPE FRAME

X-TYPE FRAME

PARTIALLY UNITIZED

FULLY UNITIZED

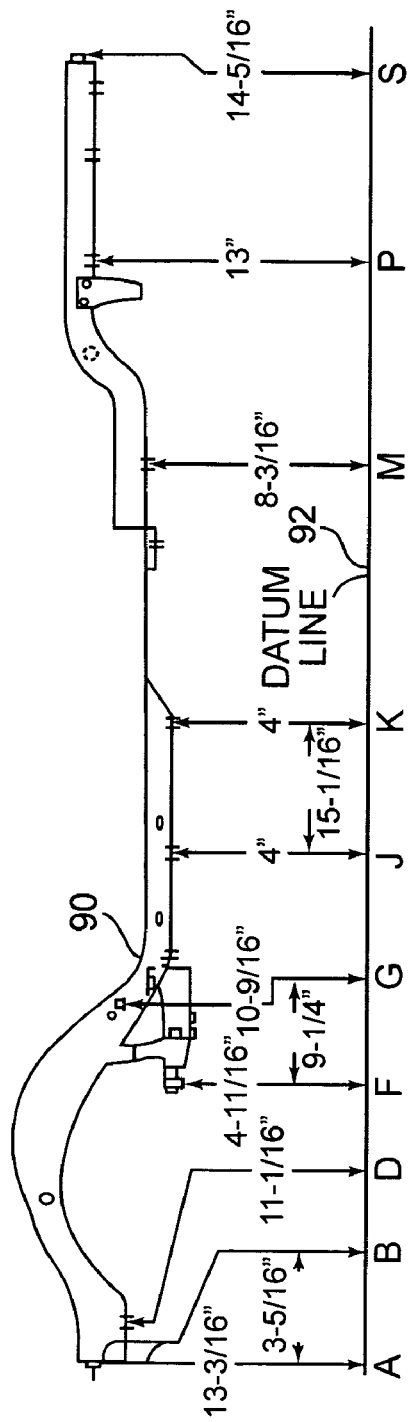
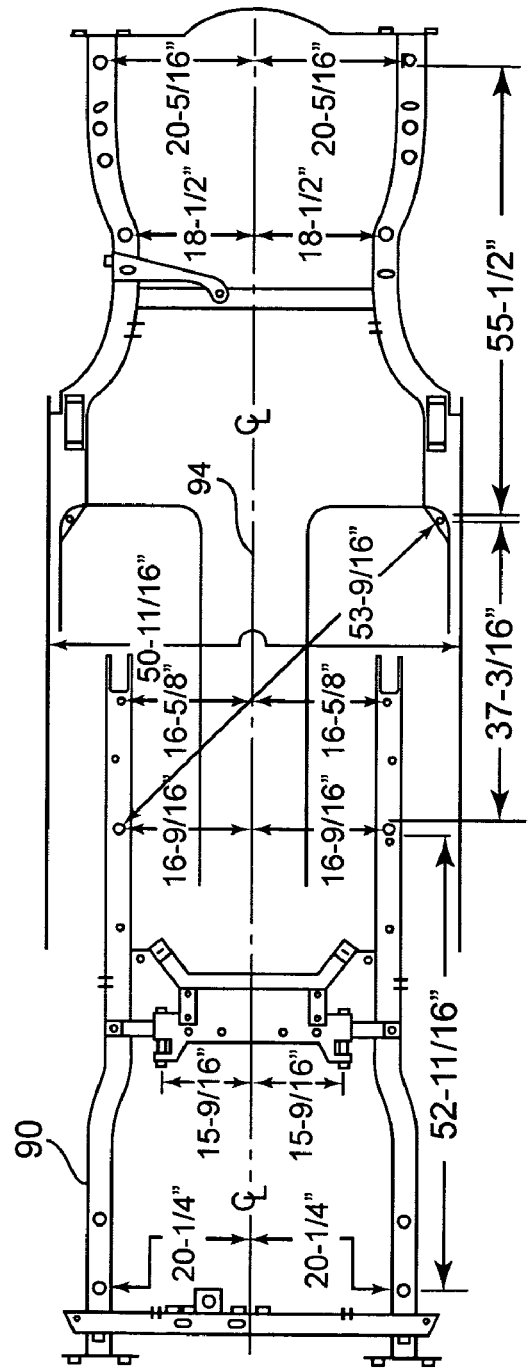
Fig. 7
Fig. 8

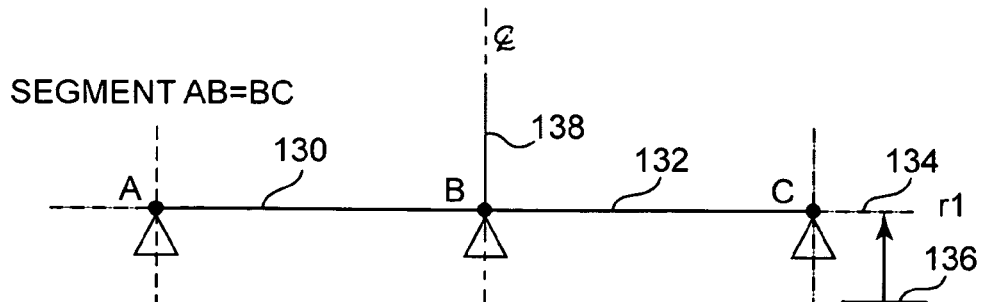
Fig. 10A
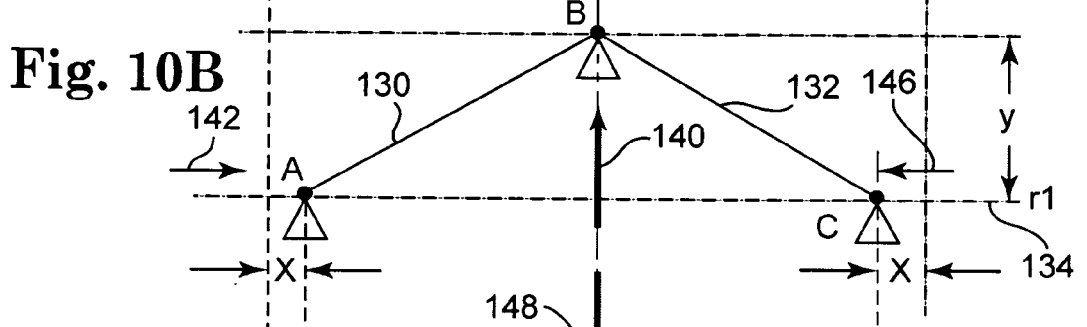
Fig. 10B
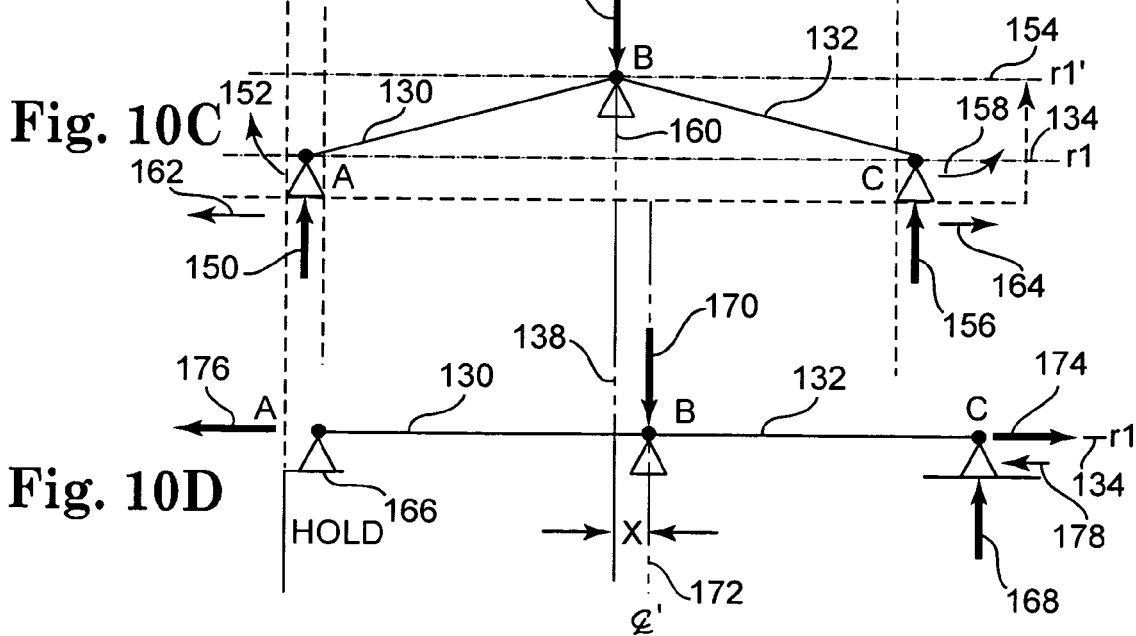
Fig. 10C
Fig. 10D

SYSTEM AND METHOD FOR REPAIRING AND RE-ALIGNING DAMAGED VEHICLE BODY AND FRAME STRUCTURES

CLAIM OF PRIORITY TO PARENT APPLICATION

This application claims priority to provisionally filed U.S. Patent Application Ser. No. 61/069,110 filed Mar. 12, 2008, which is incorporated herein by reference in its entirety.

FIELD OF THE INVENTION

This invention pertains generally to repair of damaged vehicle body and frame structures resulting from collision, roll over, natural disaster, or the like. More particularly, it relates to providing a systematic approach to analyzing the scope and nature of the damage to a vehicle and to formulating the most efficient manner of repairing the damage. Still more particularly, the invention relates to an efficient system for utilizing body and frame straightening apparatus for repairing and re-aligning a damaged vehicle body or frame structure to manufacture specifications and tolerances.

BACKGROUND OF THE INVENTION

For a number of years vehicle manufacturers have provided precise frame and body dimensions and specifications for each model and type of vehicle. Such specifications provide charts, dimensions and measurements that indicate precise reference measurement points, holes, surfaces and locations, which will collectively be referred to as 'measurement points' or 'reference points'. These reference measurement specifications relate to height of various points from a reference plane, which can be a physical plane or a virtual plane, and often referred to a datum; centerline horizontal measurements between various associated reference points; longitudinal positioning between various associated points; vertical positioning of the various associated reference points; and various point-to-point distances. When all of the specified measurements and locations of a vehicle match the manufacturer specified dimensions, the frame or body structure is straight and in alignment.

There are a variety of vehicle support structures and frame structures upon which the various body components are assembled and supported. Common vehicle structures include a frame to support various body parts and a unitized body structure, alternatively referred to herein as unit-body or unibody, wherein the entire frame and body of the vehicle are included as a single unit. The unitized body structure can be lighter in weight than a frame structure, while maintaining sufficient strength characteristics; reduces assembly cost; and is more economical. It is recognized that the various types of damage that can occur resulting from collisions, and the like, are likely to be multi-dimensional and at multiple locations such that the repair and re-alignment of all of the component parts requires multiple steps. It would of course be beneficial to have a system for repairing damaged vehicle frames and structures with a minimal number of repair processes performed in an ordered fashion.

To assist in providing specification information, vehicle manufacturers will provide requirements to measure from a reference point to a number of different types of reference points. These might include measurement to a structural element, such as a bolt head, a physical structure or the like, and in such cases will define precisely how to make the measurement. Manufactures also commonly provide fixturing holes in the frame that can be used as identified reference points to make repairs. Again, the specification will define how to utilize such fixturing holes in making measurements to determine the amount of damage and assess when alignment has been achieved.

There are several existing vehicle repair systems that separately or in combination include a lift system for raising a vehicle to comfortable working position; an anchor system to anchor the vehicle to a floor, a bench, or a platform; a measuring system for measuring selected ones of the specified measurement points to aid in determining the extent of repairs that will be needed to bring the damaged structure back into specification; and a suitable system for pulling and pushing the damaged vehicle into pre-damaged specification position. The various existing vehicle repair systems utilize a variety of independent measurement systems, and one or more utilizes an integrated measurement system. However, none of the existing systems functions to provide a system or methodology to analyze the damage and to provide a proposed sequencing of repair pulls and pushes that will minimize the time and effort to bring the damaged vehicle back into specification. It would be beneficial to have such a repair system.

Some repair systems recommend starting the repair operations at the point of impact. With the pulling and pushing capability of many frame-straightening systems, there is a tendency to make major adjustments at the outset at the point of impact. For example, a vehicle that has been damaged by impact in the rear end will often be clamped down and force exerted to pull the rear end in the direction opposite to the direction of impact in an attempt to move the structure back to pre-impact position. Such gross adjustments require extensive amounts of pulling power and can result in additional body damage as bent and distorted elements are also moved, but not necessarily in a straightening direction or directions.

There are a variety of measuring systems available for determining deviations from specification measurements. Such measuring systems can be difficult to utilize; and, as a result, many technicians fail to utilize the tools at hand. Even when used, however, such measuring systems do not assist the repair technician in deciding on what repair pulls or pushes should be done in a particular order, nor do they assist the technician in establishing the optimum directions to pull or push any selected damaged portions of the vehicle. To alleviate these deficiencies, it would be advantageous to have a vehicle repair system that would apply a specific measuring order to establish height from a predetermined datum, centerline and length distortions for selected ones of the reference relationships.

Various ones of the existing vehicle repair systems provide a great deal of versatility in applying holding, pulling and pushing forces at a large number of selected positions on the vehicle body. The applications of these forces are left to the technician to select; and, depending upon the skill and experience of any such technician, the ordering will vary substantially. Variations in the ordering of the various applications of forces, will result in a number of unwanted results, such as, brute force attempts to lengthen twisted or mashed structures will likely cause further distortion and damage to other portions of the structure; the number of operations to hold, push and pull will be unpredictable and more numerous than necessary; and the precision of returning the vehicle to pre-damage specifications will be difficult to achieve. It would be advantageous to have a vehicle repair system capable of performing damage analysis with regard to damage involving sag, twist, centerline, diamond and side displacement; and to provide a preferred and ordered system for applying damage corrective forces.

When utilizing existing repair equipment and procedures, it is common to apply pulling or pushing forces in directions that are opposite the direction of impact and damage. It is often determined that a number of such pulls and pushes will bring the various measurement points back into pre-damage specified positions, but in reality, following such a procedure, it is likely that one or more measurements will be outside accepted tolerances. It would be advantageous to have a repair system that will provide three-dimensional definition of areas of repair and would define precise holding points and associated points to apply pulling or pushing forces. In addition to defining the positions to apply pulling or pushing forces, it would be advantageous to have a vehicle repair system that would prescribe the direction of application of such forces, where direction would be understood to mean a three-dimensional vector, which in a three-dimensional graphing system would include x, y and z components in the determination of the preferred force vector.

There are a number of measurement systems available to assist in returning a damaged vehicle to specification. A common system is to provide height and width measurements and to order the repair from the top down. This approach has been found to be deficient in returning all specified measurement points to required specification.

Another available damage measurement system utilizes a number of adjustable measuring arms that can be positioned to selected measurement points for various vehicle models, and provide visual readout of measurements from a reference plane. This type of measurement system also contemplates converting the visual readout to electrical signals that can be directed externally to a visual display, such as a computer. While this system is much improved over other measurement systems, it does not provide any guidance in selecting various repair operations, nor does it provide any guidance in directing any sequence of repair operations.

Yet another type of measurement apparatus used in vehicle repair systems involve the use of jigs that are unique to each model of vehicle. The jigs are positioned on a repair structure and forces are applied to the damaged vehicle to bring the various frame or body elements back into alignment defined by the various jigs. While the jig usage is very effective during construction of vehicles, that being their intended purpose, they are less than efficient when used in a repair process because there is likely to be damage that will not be brought back into specification when only the points related to the jig positions are repaired. Since jigs vary between vehicle types, a repair facility either has to purchase the jigs for all vehicles that will be repaired, or must arrange to rent the appropriate jigs as damaged vehicles come in for repair. In addition to limitations in the use of jigs to bring a vehicle back into specification, there is an inordinate amount of cost to purchase the required jigs, or there is time delay encountered in obtaining delivery of rented jigs.

None of the known methods of measuring deviations from specification of dislocated measurement points provide correlation to the specification data for the particular vehicle type for the purpose of establishing a sequence of repair operations, nor do any of the known measurement systems provide assistance in evaluating the total extent of the damage. It would be beneficial to have such a vehicle repair system.

It is common for known vehicle repair systems to only partially repair damaged vehicles, such limitations being due to inadequacy of repair system performance, inadequacy of operator training, or a combination thereof. Failure to bring a damaged vehicle fully back within specification can result in a vehicle that is unsafe to operate or does not perform as originally designed. It would be desirable to have a repair process to bring damaged vehicles back within specification for safety of operators and performance of repaired vehicles.

There are a number of vehicle repair structures, apparatus and systems available for supporting a damaged vehicle and applying forces to the vehicle. Some of these systems include measuring systems for locating reference points on the vehicle for aiding in returning such reference points back to specification. None of these structures or systems provide adequate instruction to users relative to the process of establishing a sequence of repair operations that minimizes the number of repair steps; minimizes collateral damage caused by the repair steps; minimizes the amount of force required for each repair step to accomplish the repair operations; or how to bring the damaged vehicle back within specification. It would be desirable to have a vehicle repair system that would permit training of user operators to achieve such results.

SUMMARY OF THE INVENTION

One embodiment of the invention includes a computer implemented system for repairing a damaged vehicle including a database-selecting means for selecting a specification database for the vehicle type to be repaired; a datum-establishing means for establishing a datum; first selecting means for selecting an initial reference point with respect to the datum; second selecting means for selecting a reference point to be repaired; deviation-determining means for determining the deviation of the selected reference point from its specified position and establishing the deviation by three-dimensional measurements with respect to the datum; calculating means for calculating a force vector for defining the direction of force to be applied to the reference point to cause the reference point to be moved to its specified position; controlling means for controlling the application of force to the reference point in the direction of the force vector; positional-establishing means for establishing when the reference point is returned to its specified position and discontinuing the application of force; holding means for holding the selected reference point at its specified position; and repeating means for repeating the repair process for each of the plurality of reference points on the damaged vehicle that require repair. In this embodiment of the system the specified positional measurements for the plurality of reference points each include (i) datum measurements for each of the reference points from a datum; (ii) relational measurements of ones of the plurality of reference points with respect to associated related other ones of the plurality of reference points; and (iii) centerline measurements of selected ones of the plurality of reference points from the centerline of the vehicle.

Another embodiment of the invention for use in a vehicle repair system includes a computer implemented process for deriving a force vector that includes identifying a reference point on a vehicle requiring repair; determining the three-dimensional damaged position of the selected reference point position relative to its specified positional measurements in a three-dimensional space; and calculating a force vector for establishing the optimum direction of application of force to move the reference point to its specified positional measurements, whereby the minimal amount of force will be required to return the reference point to its specified positional measurements while causing minimal collateral damage to the vehicle during the repair of the reference point.

Still another embodiment of the invention is a method for repairing a damaged vehicle that includes the steps of selecting a specification database for the vehicle type to be repaired, wherein the database establishes positional measurements for a plurality of reference points for the selected vehicle; establishing a datum; selecting and holding an initial reference point with respect to the datum; selecting a reference point to be repaired; determining the deviation of the selected reference point from its specified position and establishing the deviation by three-dimensional measurements with respect to the datum; calculating a force vector for defining the direction of force to be applied to the reference point to cause the reference point to be moved to its specified position; applying force to the reference point in the direction of the force vector; establishing when the reference point is returned to its specified position and discontinuing the application of force; holding the reference point at that specified position; and repeating the repair process steps for each of the plurality of reference point on the damaged vehicle that require repair.

Another embodiment of the invention is for use in a vehicle repair system and is the method of repairing vehicle bodies that have identifiable sectors, and generally involves selecting the sector of a vehicle needing repair; repairing the structure of the selected sector by bringing the body reference points into specification and validating alignment of the structure in the repaired sector; repeating repair steps for all damaged sectors of the vehicle; determining whether there is any undamaged sector, including determining whether it is necessary to check alignment of any undamaged sector, and, if so, checking alignment of the sector by determining whether any reference point is out of tolerance with respect to alignment; determining whether further alignment repair is required and when necessary making alignment repair; and continuing until all undamaged sectors are determined to be within tolerance with respect to alignment.

Yet another embodiment of the invention for use in a vehicle repair system, includes a computer implemented process having steps for identifying a reference point on a vehicle requiring repair; determining the three-dimensional damaged position of the selected reference point position relative to its specified positional measurements with respect to a datum; and calculating a force vector for establishing the optimum direction of application of force to move the reference point to its specified positional measurements, whereby the minimal amount of force will be required to return the reference point to its specified positional measurements while causing minimal collateral damage to the vehicle during the repair of the reference point. An additional embodiment of the invention includes computer implementation of the foregoing method.

Still another embodiment of the invention that is for use in a vehicle repair system, is the incremental method of pairing sequential arrangements of related repair sections, that includes the steps of selecting a repair section initially including four related reference points symmetrically arranged in pairs, selecting and holding a first reference point of a first pair; selecting a diagonal reference point in a second pair; repairing the diagonal reference point of the second pair to its specified positional measurements and holding it; repairing the second reference point of the first pair to its specified positional measurements and holding it; repairing the second reference point of the second pair to its specified positional measurements and holding it; establishing another repair section by selecting a further pair of reference points related to one or the other of the pairs of reference points that have been repaired; associating one of the further pair with the diagonal one of the selected related pair and associating the other diagonal one of the further pair to the other one of the selected pair; separately repairing each one of the further pair of reference points to its specified positional measurements and holding; and repeating the incremental repair operation through successive pairs of reference points until all of the reference points that have been damaged have been repaired, whereby the repair is advanced in incremental steps in both directions from the first pair and minimizes the force required to achieve repair of each of the selected reference points.

Another embodiment of the invention is a computer system for use in a vehicle repair system, where the computer system includes a computer capable of executing programs and having an input and output system capable of receiving input signals and transmitting output signals; a display for providing visual display of data and commands; a printer for providing printed output of data and commands; a database source for providing specifications for selected vehicle types; a measurement system for receiving measurement signals from a plurality of sources and providing signals indicative of received measurement data to the computer in selected formats; programs operable on the computer capable of processing input data for—(i) treating each reference point to be repaired by processing three-dimensional measurements indicative of the dislocation of the reference point from its specified position and determining a force vector to define the direction of application of force on the reference point to return it to its specified position as determined by the database; (ii) incrementally processing successive repair sections comprised of selected reference points by causing each reference point in the repair section to be brought into its specified position as determined by the database; and (iii) verifying that repaired reference points within a repair section have been repaired to positions that assure alignment of the vehicle being repaired as determined by the database; whereby upon completion of repair of all of the selected reference points, the vehicle body has been repaired and is in alignment.

BRIEF DESCRIPTION OF THE DRAWINGS

The following is a brief description of the drawings that describe and illustrate various aspects and embodiments of the invention.

FIG. 6A illustrates a perimeter-type frame;
FIG. 6B illustrates a frame ladder-type;
FIG. 6C illustrates an X-type frame;
FIG. 6D illustrates a partially unitized frame; and
FIG. 6E illustrates a fully unitized frame.

FIG. 7 is a side view of dimensions and specifications for an illustrative vehicle frame as typically provided by a manufacturer.

FIG. 8 is a bottom view of the frame of the vehicle shown in FIG. 7.

FIG. 10A through FIG. 10D illustrate centerline displacement and datum reference displacement concerns arising from characteristic repair steps for an illustrative line deformation.

DETAILED DESCRIPTION OF THE PREFERRED EMBODIMENTS

The descriptions of the preferred embodiments, along with the accompanying drawings, are illustrative of the various aspects of the invention and are not intended to define the scope or limitations of the invention. The invention includes these embodiments, may have these and other embodiments, and what is intended to be protected is set forth in the Claims.

Vehicle Damage

To understand the invention it is desirable to understand the nature of vehicle damage and the necessity to have a repair process to bring damaged vehicles back within specification for safety of operators and performance of repaired vehicles. There are a number of common types of damage to vehicles, many of which can advantageously be repaired pursuant to this invention. The various general types of damages include bending, crushing, widening, twisting, and isolated damage with remote consequences.

Figure 1:
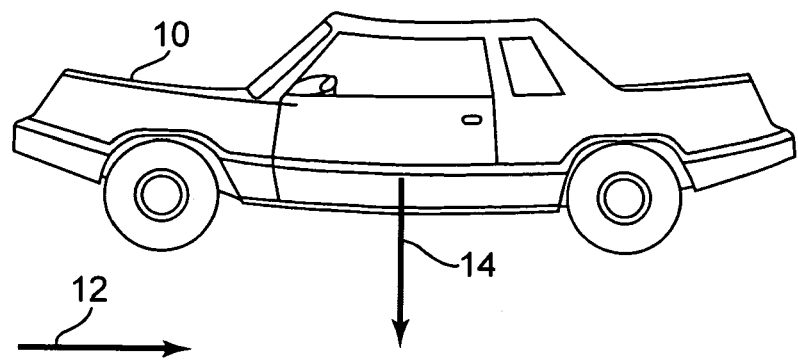
FIG. 1 is a pictorial view of bending damage to a vehicle during impact.

FIG. 1 is a pictorial view of bending damage to a vehicle during impact. When vehicle 10 has force applied in the direction of arrow 12, it causes lateral or vertical bending, which may include sag, in the central structure as shown by arrow 14. Most of the forces that broadcast impact shock throughout the vehicle occur shortly after the initial application of force. Though there is a tendency for the vehicle to spring back toward its initial condition after the initial force of impact is discontinued, it is important to note that various portions of the vehicle may not return to be within specification.

Figure 2:
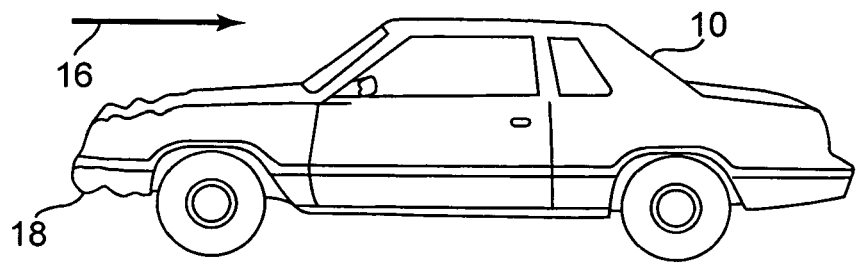
FIG. 2 is a pictorial view of crushing damage to a vehicle during impact.

FIG. 2 is a pictorial view of crushing damage to a vehicle during impact. When the force applied in the direction of arrow 16 continues, crushing of the structure will occur in the area of impact 18 as the force of the impact is absorbed by vehicle 10. In modern passenger vehicles, crumple zones are specially designed to crush and absorb the impact energy through deforming the structure prior to the passenger compartment. Depending upon the level of the force applied, areas of the vehicle remote from the impact may be damaged or pulled apart. Again, it is necessary during the vehicle repair process to address damage at the point of impact and at remote locations to assure that the entire structure is brought back within specification.

Figure 3:
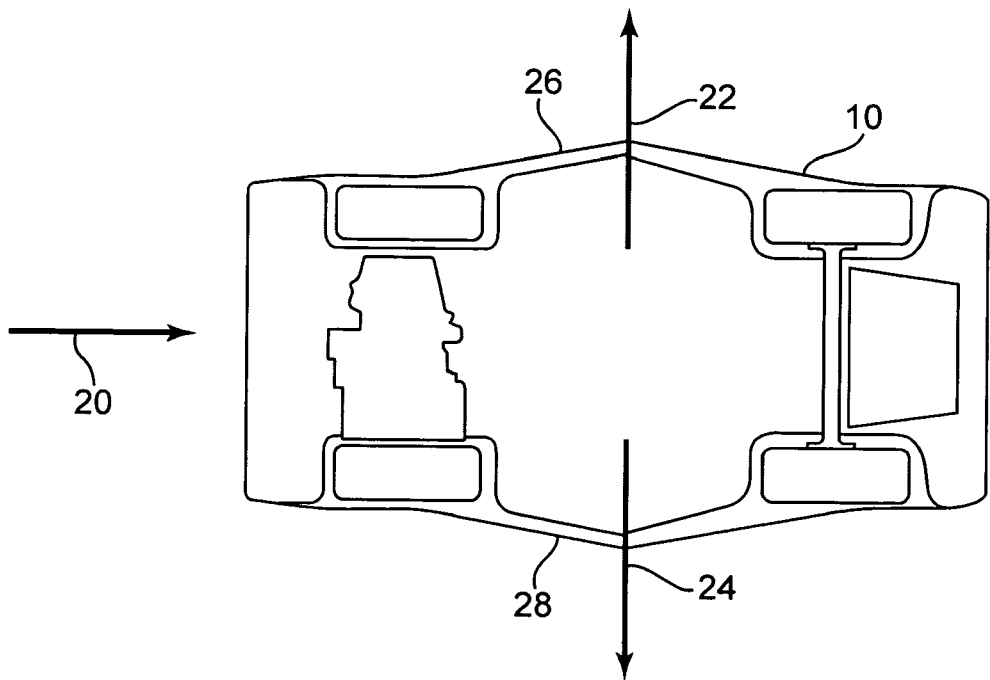
FIG. 3 is a pictorial view of widening damage to a vehicle during impact.

FIG. 3 is a pictorial view of widening damage to a vehicle during impact. In a properly designed unibody vehicle structure, when the force applied in the direction of arrow 20 is sufficient to reach the passenger compartment, the structure will widen and tend to bow outwardly at the sides in the directions of arrows 22 and 24, thereby protecting passengers through distortion of door opening (not shown) and side rails 26 and 28.

Figure 4:
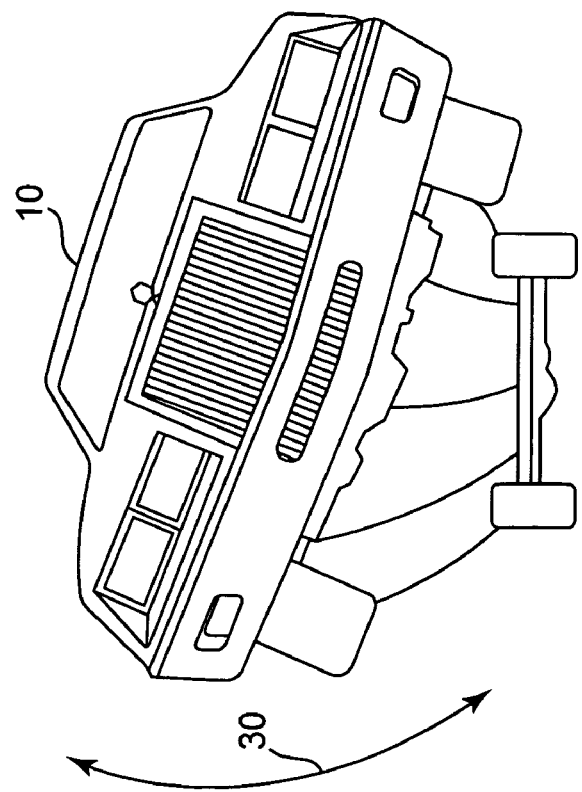
FIG. 4 is a pictorial view of twisting damage to a vehicle during impact.

FIG. 4 is a pictorial view of twisting damage to a vehicle during impact. When vehicle 10 collides with another vehicle or object, the angle of impact is seldom exactly aligned, and when it is aligned, vehicle 10 and its impact structure (not shown) are likely to be off-set with respect to the centerline of vehicle 10. Such an impact tends to create torsion forces in the direction of arrow 30 that causes twisting damage to the vehicle structure. Twisting damage can provide damage to the structure remote from the point of impact, and for proper repair, requires inspection and bringing the entire structure back within specification. This will be described in more detail below.

Figure 5:
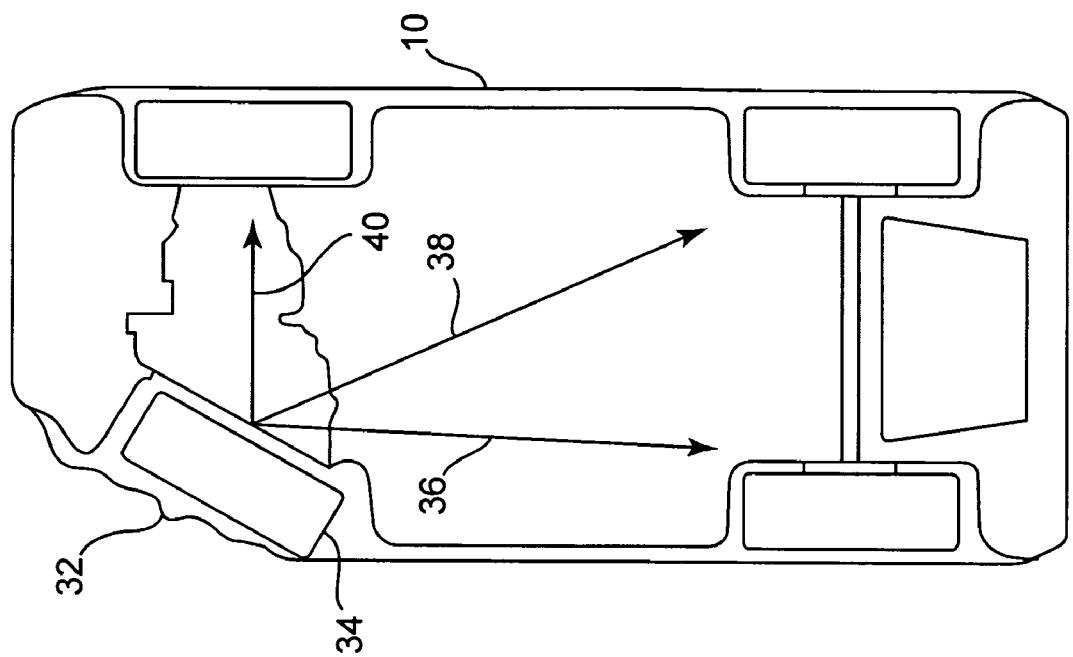
FIG. 5 is a pictorial view of damage remote to the impact area of a vehicle during impact.

FIG. 5 is a pictorial view of damage remote to the impact area of a vehicle during impact. As viewed from the bottom of vehicle, the result of impact 32 is severe visible damage to wheel assembly 34. In addition to such clearly visible damage, the force of the impact is also transmitted to other remote locations, as indicated by arrows 36, 38, and 40. These applications of collision forces may cause frame and body misalignment at the remote locations. Though the damage may appear to be localized to the vicinity of the impact 32, it is preferable to inspect all aspects of the vehicle for conformance to specification. A unibody construction requires more careful attention than perimeter frame construction, because remote damage may be harder to detect visually, but in both cases, failure to detect remote damage can result in a repaired vehicle that has not been restored to specification. The consequences of such a failure may be a vehicle that is returned to service that is out of alignment, is not mechanically sound, leaks, or is otherwise unsafe. As will be described below, embodiments of the invention address these concerns.

It is of course understood that similar types of damage can occur when the impact force is applied to other portions of vehicle 10. It is also understood that multiple combinations of damage types can occur when, for example, there is collision damage followed by roll-over; multiple vehicle collisions; sequential collisions; or the like.

Vehicle Frame Types

FIG. 6A through FIG. 6E illustrate various vehicle frame types. Vehicle construction types can be considered as being within two basic categories, namely, (a) separate frame and body constructions and (b) unit body construction. These will be briefly described below to illustrate that various embodiments of the invention may be utilized to repair damage to these illustrative frame types, as well as other frame configurations that might be used or may come into usage.

The separate frame and body construction uses a separate frame upon which the body structure of the vehicle is mounted. In addition to the body structure, the systems providing steering, suspension and power are also attached to and supported by the frame. The body components can all be removed from the frame structure and the remaining assembly remains functional. There are basically three major types of separate frame structures types identified as perimeter, ladder, and X-type.

Figure 6A:
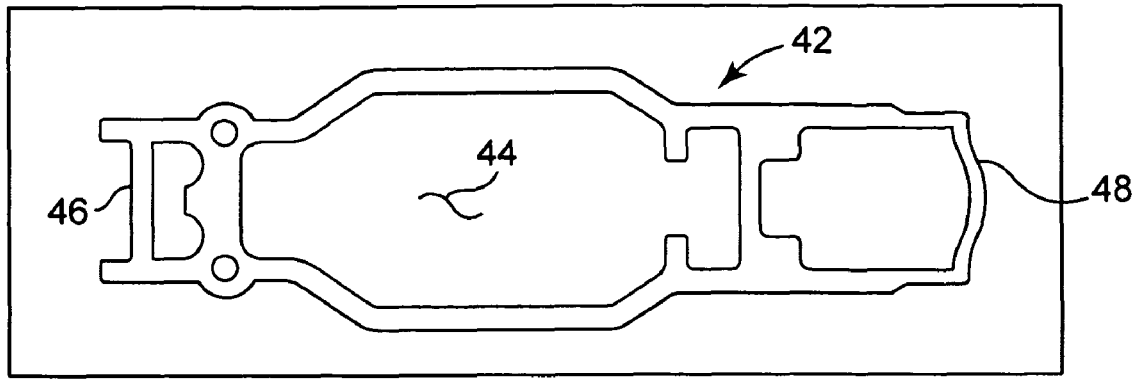
FIG. 6A through FIG. 6E illustrate various vehicle frame types where

FIG. 6A illustrates a perimeter-type frame 42 where the frame rails completely surround the passenger area 44, and extend forward to structure 46 for power train and suspension support, and extend rearward to structure 48 for trunk and suspension support. The frame rails are commonly of channel or box structure joined at the four corners. The body (not shown) that is mounted to the perimeter-type frame 42 adds structural rigidity.

Figure 6B:
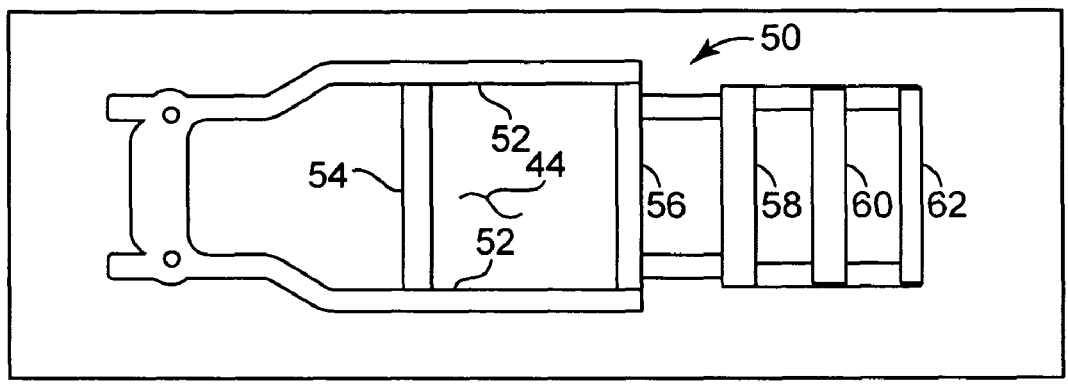

FIG. 6B illustrates a ladder-type frame 50 that is a predecessor of the various types of frames that are now in more common usage. The side rails 52 do not completely surround the passenger area 44. The structure generally has a number of cross-members, such as cross-members 54, 56, 58, 60, and 62 that provide structural rigidity and mounting structures. This provides a strong and rigid structure to support the body.

Figure 6C:
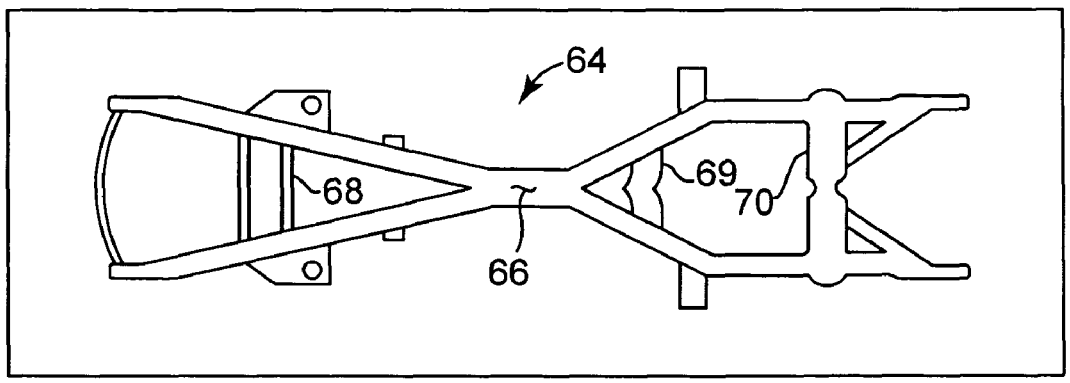

FIG. 6C illustrates an X-type frame 64 that is constructed of members in a generally elongated X form narrowing to a strong junction structure 66 at the center section. A number of cross-members, such as members 68, 69, and 70 provide torsional strength and stability. There are no cross-members at the center section, and neither is there is there any structure surrounding the passenger area.

The unit-body construction is formed when the frame is constructed as part of and is integrated with the body by welding the various components together. In general, the unit-body structure provides mounting for the suspension system as well as for the engine and drive-train mechanism. As such, the body structure and the support structure together form the structure that must be considered together in the event of damage. Unit-body structures can be categorized as (1) partially unitized, often referenced as a stub frame; and (2) fully unitized, often referred to as a unicoupe.

Figure 6D:
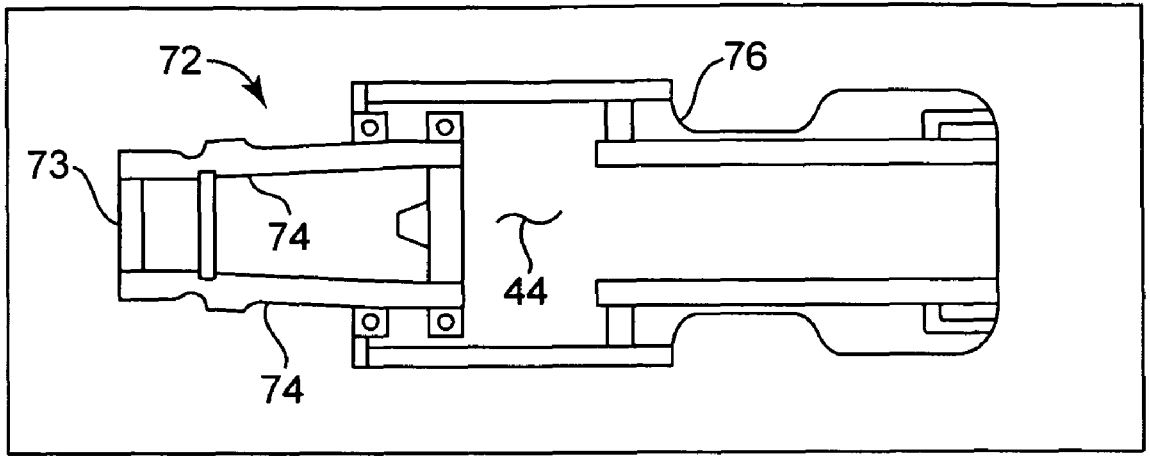

FIG. 6D illustrates a partially unitized frame 72 and utilizes features of the separate frames and the fully unitized frames. A partial frame 73 includes rails 74 and is mounted to a unitized body portion 76, and extends from the cowl (not shown) forward. The unitized body 76 extends rearward and encompasses the passenger compartment area 44.

Figure 6E:
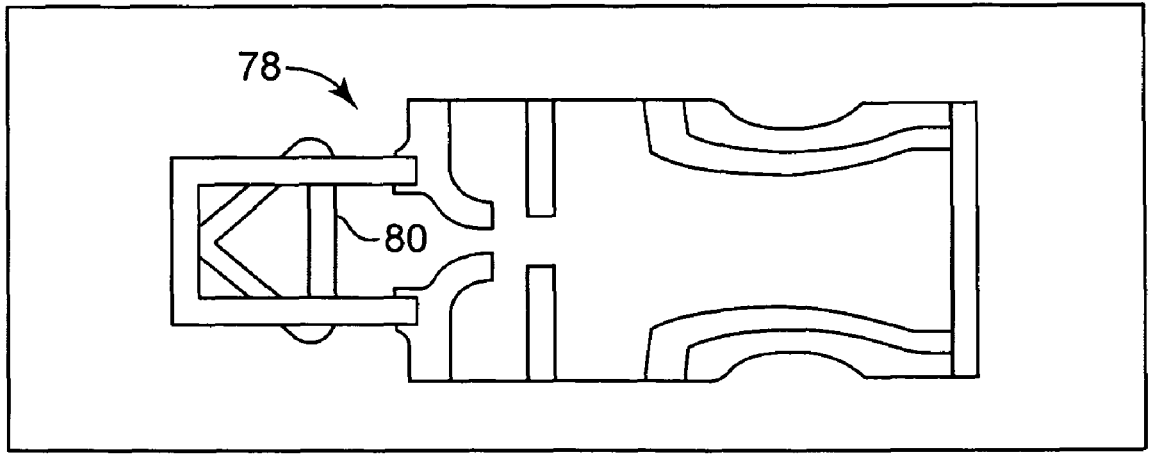

FIG. 6E illustrates a fully unitized frame structure 78. The unitized frame structure is formed by welding various frame structure elements into the frame/body element to form a unitized structure. Body panels (not shown) and a floor pan (not shown) add strength to the frame pieces and form a unitized under-body. A cradle structure 80 is formed of front and side cross-members and is utilized to support a front suspension (not shown), an engine (not shown), a transaxle (not shown) and various other drive train components (not shown).

While each of the frame types described have various advantages and disadvantages relative to strength, weight, noise, vibration, and ride characteristics, it is essential for each of them that proper alignment be restored following damage to an associated vehicle.

Vehicle Frame Specifications

FIG. 7 and FIG. 8 taken together are examples of chassis dimension charts provided by manufacturers or other commercial data sources, and are provided to define terminology and explain various measurement points, it being understood that similar specification data must be obtained for each model vehicle to be repaired. The measurements are based upon factory specifications; and, in the case of unibody vehicles, are usually measured with the vehicle supported on the pinchwelds (not shown) found at the front and rear torque box areas. In both FIG. 7 and FIG. 8 there are more dimension measurements than those shown and the measurements provided by the manufacturer or other specification source collectively result in specification for the particular vehicle.

From the foregoing, and from descriptions below, it will be understood that there are basically three major categories of measurement relationships. The first major category includes the relationships from a positional perspective of the various measurements from the various measurement points to the datum, which will be referenced as 'positional measurements'. The second major category includes the relationship perspectives of the various measurements that are specified between associated reference points, which will be referenced as 'relational measurements'. The third major category includes the frame alignment perspectives of the various measurements that are specified between specified reference points and the centerline, which will be referenced as 'centerline measurements'. For the most part, positional measurements will normally be vertical, centerline measurements will normally be horizontal, and relational measurement may be in any plane.

FIG. 7 is a side view of dimensions and specifications for an illustrative vehicle frame as typically provided by a manufacturer. The various measuring points by alphabetical letters represent fixturing elements on frame 90, such as holes, bolts, nuts, studs, non-removable plugs, rivets, and the like. A datum line 92 is a line that represents a reference plane parallel to frame 90 and arranged a fixed distance below frame 90, and all positional measurements are measured perpendicular to the datum or reference plane. The datum is specified for manufacture purposes, and to that extent is imaginary. The datum may be a real surface or may be a virtual plane established to define an assumed plane of reference. For repair purposes, the damaged vehicle must be established with respect to some fixed plane, such as a floor, the bed of a repair structure, or an electronically established reference level. The requirement is that a physical datum be sufficiently planar such that across its surface the level is such that the tolerances required for specification measurement can be maintained. Deviations in the planar surface of plus or minus one millimeter, or more, will negatively affect measurements for the required repairs.

In addition to the positional measurements, the specification includes relational measurements between associated reference points along the length of frame 90. These relational measurements are illustratively shown between reference points A and B; F and G; and J and K.

FIG. 8 is a bottom view of the frame of the vehicle shown in FIG. 7. This view of frame 90 is from the bottom of the vehicle and illustrates the basic symmetry of centerline measurements of dimensions of reference points around the centerline (CL) labeled 94. Adherence to these specification centerline measurement dimensions is necessary for the vehicle to be properly aligned. As will be described in more detail below, this specification data can be accumulated for all of the vehicle models to be considered for repair, and can be loaded in a computer to form the data base that is used for evaluation of levels of damage, providing direction to areas and locations needing repair, and projection of sequence of repair operations for each vehicle model.

Figure 9:
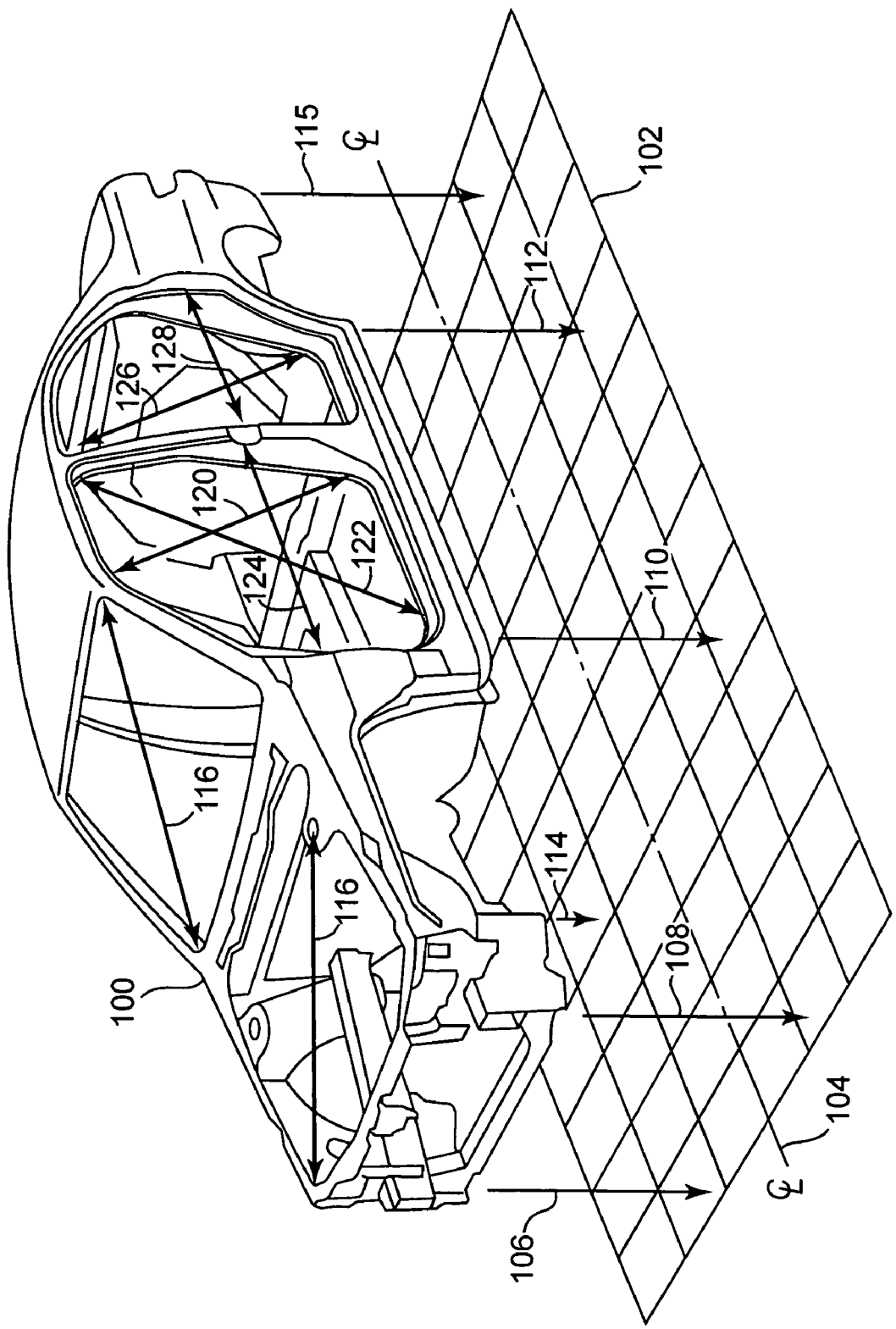
FIG. 9 is an illustrative three-dimensional view of a unitized vehicle body positioned relative to a datum.

FIG. 9 is an illustrative three-dimensional view of a unitized vehicle body positioned relative to a datum. The unibody 100 is illustrated above datum 102 and positioned with relation to centerline (CL) 104. Arrows 106 and 108 provide positional measurements of reference heights at the front corners from datum 102; arrows 110 and 112 provide positional measurements of reference heights at the front and rear, respectively, of the passenger compartment, arrow 114 at the off-side front of the passenger compartment, it being understood that similar positional height reference (not shown) would be similarly shown for the rear of the passenger compartment on the opposite side of vehicle body 100; and arrow 115 provides a height reference at the rear corner. For ease of illustrating the various other dimensions, the various components that would be mounted to body 100 are removed. For illustrative purposes, arrow 116 indicates the relational measurement relative to the front compartment extending from a reference point to the right front corner; arrow 118 indicates the diagonal opening measurement of the windshield opening; arrows 120, 122, and 124 indicate measurements within the front door opening; and arrows 126 and 128 indicate measurements within the rear door opening. From these illustrative relational measurement positions it will be understood that in addition to the positional heights specified with reference to the datum 102, repair of the unibody 100 will require additional effort to measure and bring the various other specified relationships back in specification tolerance as part of the repair process. Embodiments of the invention to achieve these three-dimensional repairs will be described below.

Datum & Centerline Considerations

FIG. 10A through FIG. 10D illustrate centerline displacement and datum reference displacement concerns arising from characteristic repair steps for an illustrative line deformation, where FIG. 10A illustrates an element comprised of segments AB 130 and BC 132, where AB equals BC, and are located at a positional reference line r1 134 that can be an assumed relationship to a datum 136. A centerline CL 138 passes through B and is constant for the descriptions in FIG. 10B through FIG. 10D. The following example will illustrate the concern of maintaining the elements and components of a vehicle within tolerance with relation to a datum and to the centerline when performing repair and realignment processes.

FIG. 10B illustrates the result of a force being applied in the direction of arrow 140 to B. As B is displaced a distance y from reference level r1 134, A moves in the direction of arrow 142 a displacement distance x, and C moves in the direction of arrow 146 a similar displacement distance x. For this example and for ease of explanation, it is assumed that A and C remain at reference level r1 134.

FIG. 10C illustrates an alternative corrective action where in a first operation, a holding force 148 force is applied to B. In this first holding condition A and C can be manipulated simultaneously or one at a time. While holding B, a force is applied to A in the direction of arrow 150. When thus applied, A will move in the direction of arrow 152 and A will move until it aligns with B at a new reference level r2 154. In a similar manner, when a force is applied to C in the direction of arrow 156, it will move in the direction of arrow 158. When moved sufficiently, C will also align with B at reference level r2 154 and centerline 138 will be maintained. This example illustrates, however, that while maintaining the centerline 138, the positional reference r2 with respect to datum 136 has not been maintained, and has been relocated the displacement distance y that B was originally displaced.

In an alternative example, rather than holding B, a moving force can be applied in the direction of arrow 148 while A and C are each supported at reference level r1 134 by forces 150 and 156, respectively, but are allowed to move laterally. In a vehicle structure where A and C would be connected to or integral with adjacent structure (not shown), such structure might provide the holding forces 150 and 156, though maintenance at the reference level r1 may be at risk. When C is thus moved in the direction of arrow 160, A will move in the direction of arrow 162 and C will move in the direction of arrow 164; and, when C has been sufficiently moved, A, B, and C will align on reference r1 134.

FIG. 10D illustrates other corrective processes that can be applied to the displacement of B from reference r1, as shown in FIG. 10B. As shown, A is displaced a distance x from its original position and is subjected to physical HOLD 166 and a selected one of several possible corrective actions can be applied. One such action is to support C by a force applied in the direction of arrow 168, while allowing C to move laterally, thus maintaining C at the reference plane r1. When A is thus held and C is supported a force can be applied to B in the direction of arrow 170 until AB and BC align on reference r1 134 relative to datum 136, but it will be noted that centerline CL 138 has not been maintained. When thus corrected, as to alignment centerline CL 138 has been displaced by the distance x, as shown by centerline position CL' 172.

An alternative corrective action when A is held is to apply a pulling force at C in the direction of arrow 174. When sufficiently pulled, segments AB and BC will again align along reference r1, but with the centerline CL' displaced a distance x as previously discussed.

Yet another alternative corrective action when A is held is to apply a force at B, as previously described, while at the same time applying a pulling force at C. Such an alternative results in the same corrective actions and centerline displacement, but can be accomplished with smaller forces 170 and 174.

To correct the centerline displacement, the HOLD 166 at A must be released and a pulling force applied in the direction of arrow 176 sufficient to move segments AB and BC the distance x such that the centerline CL 138 is aligned with B, or a pushing force is applied at C in the direction of arrow 178 such that centerline CL 138 is aligned with B. Alternatively, both a pulling force and a pushing force could be applied as described above, during the same type of centerline adjustment movement, where such forces can both be smaller than required for the individual adjustment.

It will readily be understood that the foregoing examples of datum and centerline concerns are further complicated when various repair operations are to be made involving vehicle structures that are integral or are connected to other structures. Various embodiments of the invention will be described below that will address these and other repair concerns.

Force Vector Determination

Figure 11:
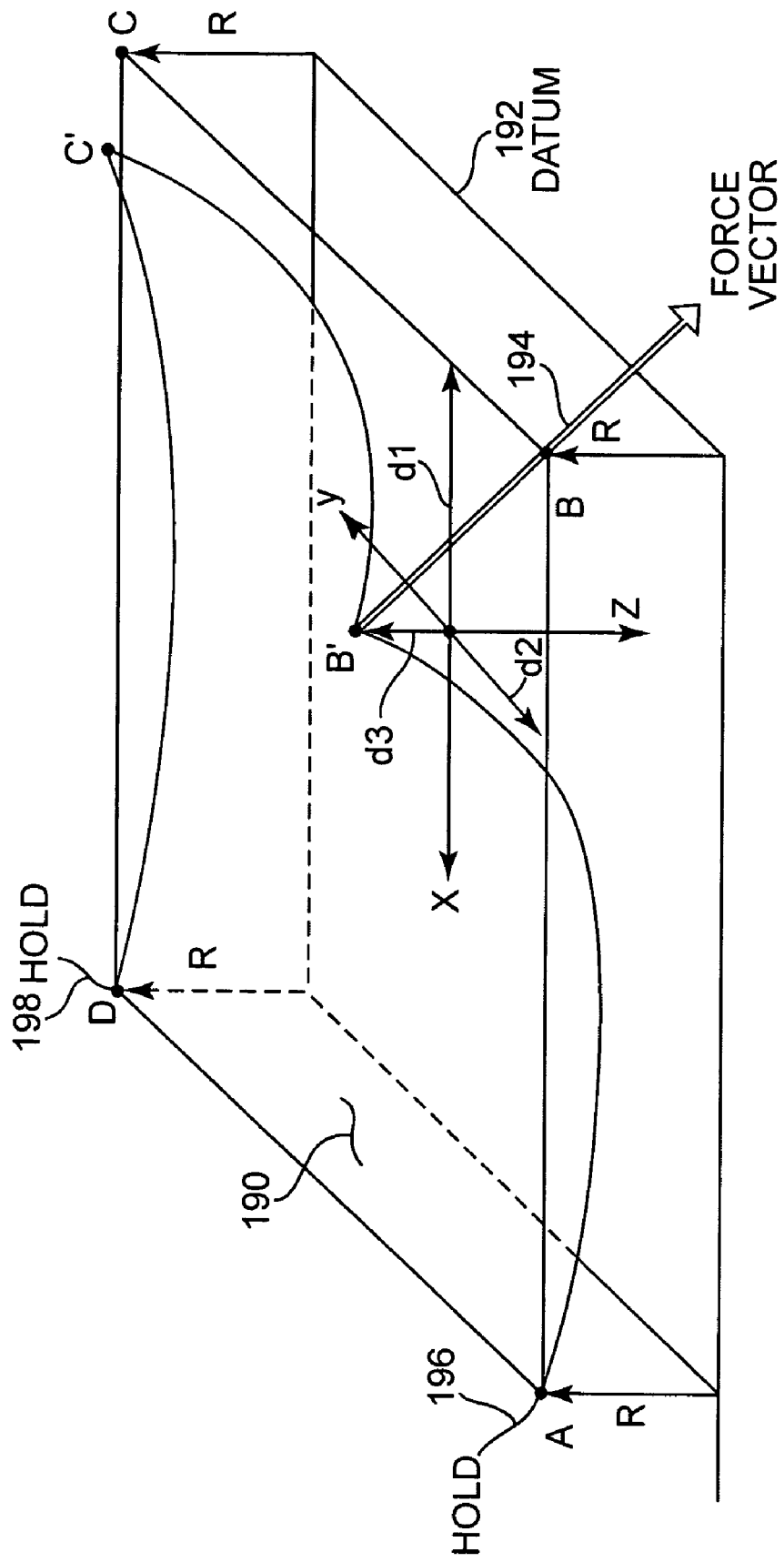
FIG. 11 is a three dimensional view of deformed rectangular member illustrating development of a repair force vector.

FIG. 11 is a three dimensional view of deformed rectangular member illustrating development of a repair force vector. A rectangular member 190 in its original state is flat with its corners A, B, C, and D at a reference level R from datum 192. In its deformed state corner B is deflected to B' and corner C is deflected to C' such that member 190 is no longer flat. Corner B has moved a distance d1 on the x-axis, a distance d2 on the y-axis, and a distance d3 on the z-axis to its deformed position B'. These distances are used to determine the direction and slope of force vector 194 to return B' to B. The force vector 194 will not be a straight lateral force in the x plane, nor will it be a straight vertical pull in the y plane. Rather it will have a slope extending from B' at a downward angle through the B position. The determination of the force vector for each repair operation will utilize the displacements in the x plane, y plane, and z plane of each of the reference points under consideration to establish the direction and three dimensional path of the forces to be applied in each of the repair steps. It is of course understood that for any particular reference point under consideration, the direction of the required repair force may involve either a pulling force or a pushing force in the direction of the force vector to achieve the corrective action.

To accomplish a repair, where for this example A and D have not measurably moved from their respective positions with respect to datum 192, in one embodiment of the invention, portions A and D would be held as by HOLD functions 196 and 198, respectively. Once A and D are held, B' is pulled in the direction of force vector 194 until B' is returned to the original B position, and it too is then held. At that time C' will likely be moved closer to its original position C, but due to the deformation may not be exactly aligned with its original position. Once A, D, and reposition B are held, a force vector (not shown) can be calculated for the floating C'; and, when applied, will reposition C' to its original position C. At that juncture member 190 will have been repaired to its original planar condition and it will be uniformly at its reference height R from datum 192. It will be readily recognized that for various types of damage, such as frame or unibody bowing, a calculated force vector for pushing can be determined in a similar manner. Various embodiments of the invention will utilize force vectors as herein described.

Repair Sections

Figure 12:
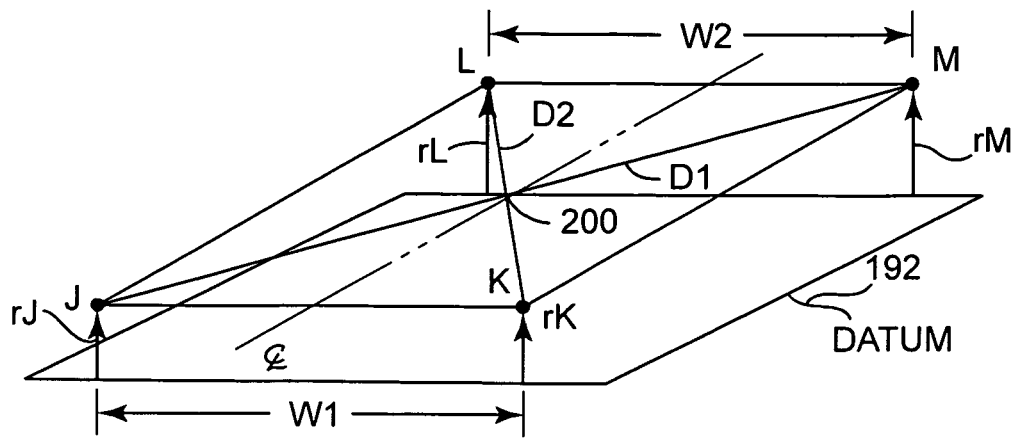
FIG. 12 illustrates a repair section having four reference points with two points displaced from a DATUM a first distance and two points displaced from the DATUM a second distance, with all four points in proper relationship with a centerline.

FIG. 12 illustrates a repair section having four reference points with two points displaced from a DATUM a first distance and two points displaced from the DATUM a second distance, with all four points in proper relationship with a centerline. Measurement points J and K are displaced a reference distance rJ and rK, respectively, from the DATUM 192, and for this illustration rJ is equal to rK. Points J and K are spaced apart a distance W1 and are symmetrical with respect to centerline CL and DATUM 192. Measurement points L and M are displaced a reference distance rL and rM, respectively, from the DATUM 192, and for this illustration rL is equal to rK. Points L and M are spaced apart a distance W2 and are symmetrical with respect to centerline Cl and DATUM 192. Points J and K are equidistant from centerline CL and points L and M are equidistant from centerline CL. When distance W1 equals distance W2, it will be recognized that connecting J to K, K to M, M to L, and L to J results in a virtual rectangle. The virtual rectangle has diagonal D1 between points J and M, and has diagonal D2 between points K and L; and, when properly aligned, diagonal D1 is equal in length to diagonal D2. Rather than illustrating the centerline Cl on DATUM 192, it is illustrated projected on the plane formed by the virtual rectangle. As thus projected, centerline CL intersects the crossing point 200 of diagonal D1 and diagonal D2. It is of course understood that when the centerline CL is illustrated on the DATUM plane, the point of crossing of diagonal D1 and diagonal D2 would be displaced from but in alignment with centerline CL. In various embodiments of the invention the diagonal measurements between associated pairs of reference points will be utilized to verify that the respective reference points for the repair section have not only been brought into specification measurements with respect to DATUM 192, but that the various reference points have also been brought into proper position with respect to centerline CL. In the event a measurement of diagonal D1 indicates that it does not equal the length of diagonal D2 it would be necessary to move one or more of the reference points laterally until diagonal D1 is equal in length to diagonal D2. In the symmetrical relationships illustrated, the distance of point J to the centerline CL must be brought equal to the distance of point K from the centerline CL, and the distance of point L from the centerline CL must be brought equal to the distance of point M from the centerline CL, thereby assuring that no skew or misalignment of the repair section has occurred.

It will be understood, then, that with respect to properly aligned points J, K, L, and M, the six measurements (1) between points J and K, identified as W1; (2) between points L and M, identified as W2; (3) between points J and L; (4) between points K and M; (5) diagonal D1 between points J and M; and (6) diagonal D2 between points K and L, will define proper alignment of the points when respectively positioned at the reference distances from the DATUM 192. When any of the reference points are displaced, the virtual shape defined by these six measurements will govern the return of any displaced points to establish that such displaced points have been returned to specification. It is of course understood, as will be further described below, that the described virtual shape and measurements can be developed parallel with DATUM 192 or can be developed in the plane described by the reference points. For ease of reference these six lines or measurements will be collectively referred to as horizontal lines or HLs.

Figure 13:
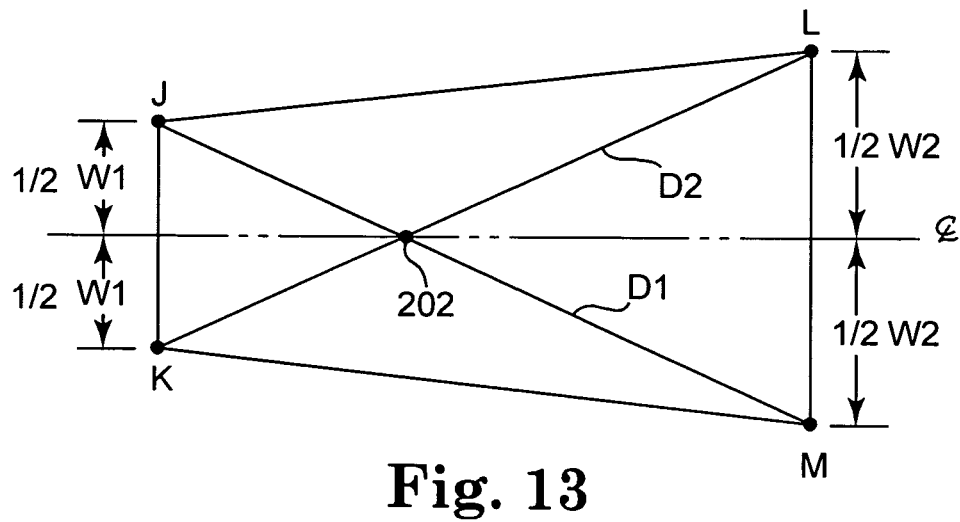
FIG. 13 is a plan view of the reference points of a repair section illustrated in FIG. 12 with the width dimension of one pair of points being greater than the width dimension of the second pair of points.

FIG. 13 is a plan view of the reference points of a repair section illustrated in FIG. 12 with the width dimension of one pair of points being greater than the width dimension of the second pair of points. In this illustration the spacing W2 between points L and M is greater than the spacing W1 between points J and K. The structure represented is symmetrical in that points J and K are each a distance of ½W1 from the centerline CL, and points L and M are each a distance of ½W2 from the centerline CL. The length of diagonal D1 is equal to the length of diagonal D2 and they intersect along centerline CL at point 202.

Figure 14:
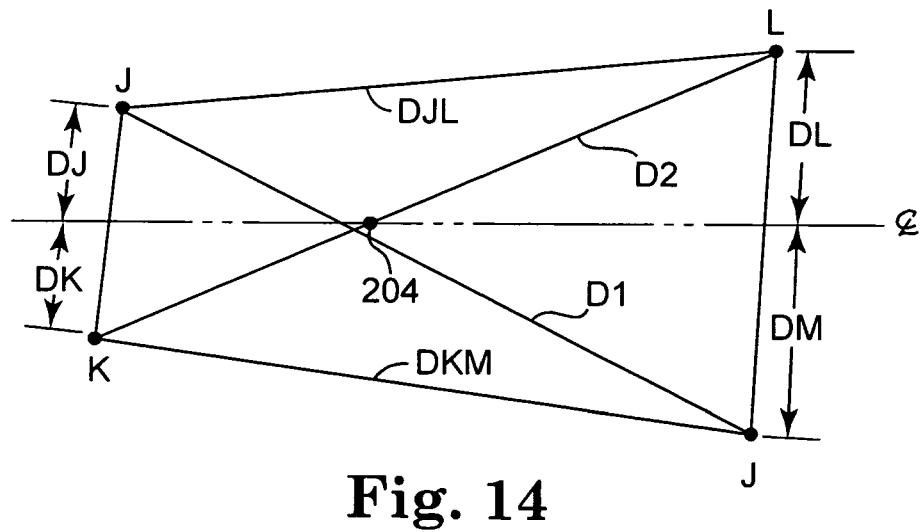
FIG. 14 is plan view of the reference points of a repair section illustrated in FIG. 13, with one or more of the reference points out of symmetrical relationship to the centerline.

FIG. 14 is plan view of the reference points of a repair section illustrated in FIG. 13, with one or more of the reference points out of symmetrical relationship to the centerline. As shown the distance DJL between reference points J and L is substantially equal the distance DKM between reference points K and M. The sum of the distance DJ of point J from the centerline CL and the distance DK of point K from the centerline CL is approximately equal the width dimension W1, but the dimension DJ does not equal the dimension DK. In a similar manner the sum of the distance DL of point L from the centerline CL and the distance DM of point M from the centerline CL equal to the width dimension W2, but dimension DL does not equal the dimension DM. In this configuration, the four-sided repair section is symmetrical and the lengths of diagonals D1 and D2 are approximately equal, but the crossing point 204 does not intersect centerline CL. This view illustrates that when the four-sided repair section defined by the reference points is symmetrical with respect to its dimensions, but is out of alignment with the centerline CL, it is necessary to adjust either or both points J and K until the distance DJ is approximately equal to the distance DK, and to adjust either or both points L and M until distance DL is approximately equal to distance DM, while at the same time maintaining the length of diagonal D1 approximately equal to the length of diagonal D2. When finally adjusted, crossing point 204 will intersect centerline CL.

From a consideration of the relationships described with regard to FIG. 12, FIG. 13 and FIG. 14, it is recognized that whether distance W1 is equal to distance W2, or distance W1 is less than distance W2, or distance W1 is greater than distance W2, the diagonal lengths D1 and D2 will be equal when the reference points are properly positioned with respect to each other. Further, it will be understood that even though the reference points may all be brought in specification for their respective specified relations to the DATUM 192, it is only when all of the foregoing described relationships of the reference points of the repair section are satisfied that the repair section is in proper alignment with the centerline CL.

Repair Process

To effectively utilize any one of the various embodiments of the invention that will be described, it is necessary to understand that there are a number of fundamental differences in the approaches to repair from the approaches and methods of the prior art. A number of repair approaches will become better understood from a consideration of the descriptions of the various embodiments of the invention.

Figure 15:
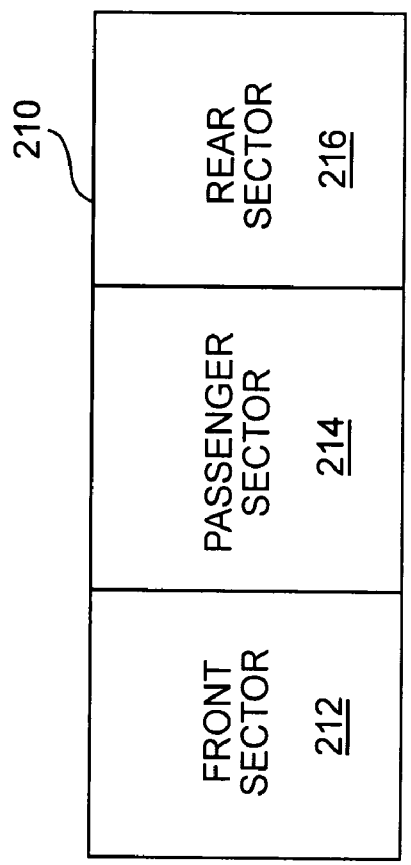
FIG. 15 is a view of the major sectors of motor vehicle.

FIG. 15 is a view of the major sectors of motor vehicle. A vehicle 210 is illustrated as having a front sector 212, a passenger sector 214 and a rear sector 216. Damage to a vehicle, depending upon the nature of the impact, may result in damage to only a single sector, two sectors, or all sectors. While a vehicle can be evaluated and repaired as a total entity, it has been found that consideration of the various sectors separately can result in a more efficient repair process.

Figure 16:
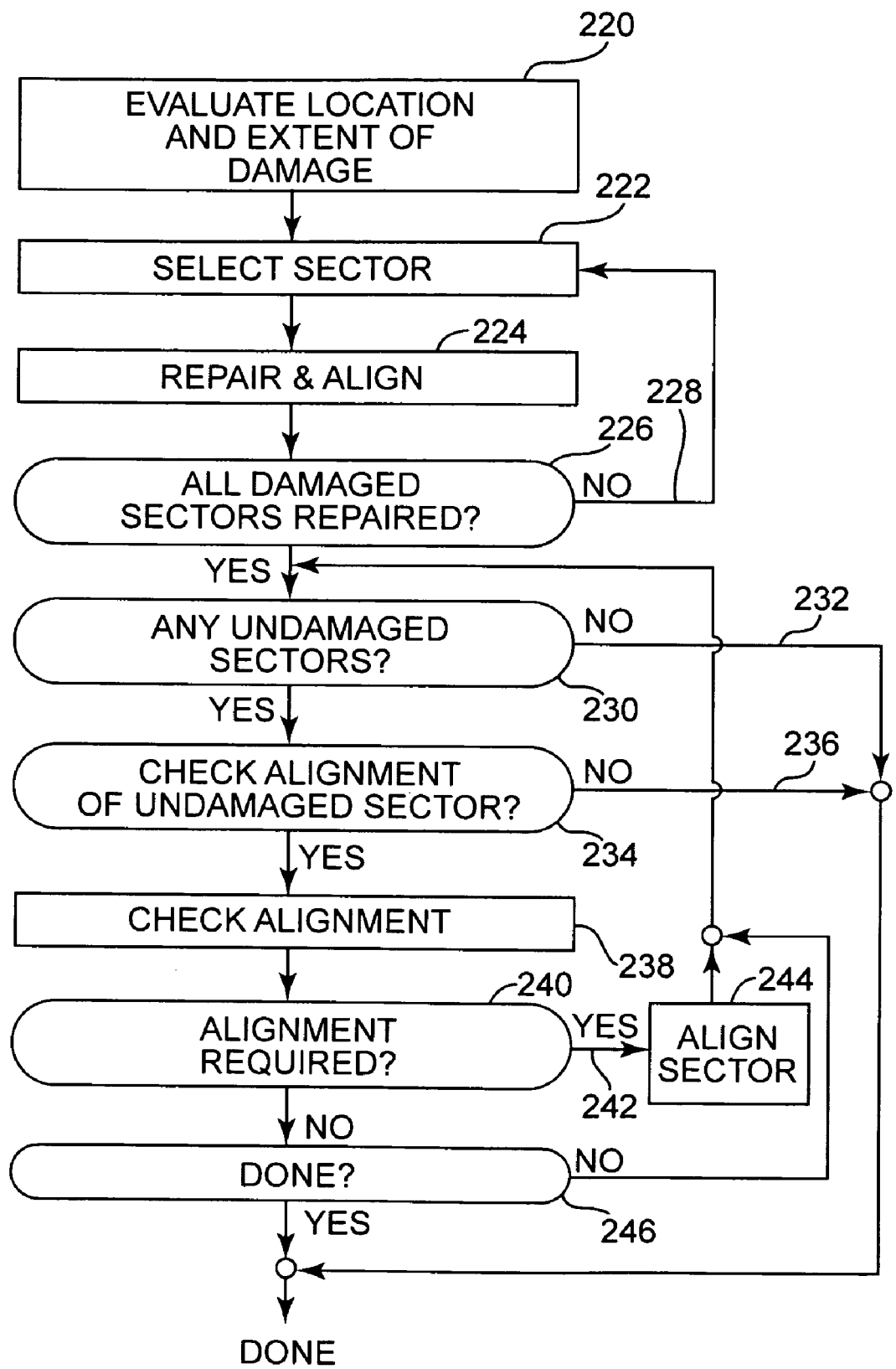
FIG. 16 is a flow diagram of one embodiment of the process of vehicle repair based upon an evaluation of damage to identified vehicle sectors.

FIG. 16 is a flow diagram of one embodiment of the process of vehicle repair based upon an evaluation of damage to identified vehicle sectors. When a damaged vehicle is presented for evaluation and repair, an operator should evaluate the nature and location of identifiable damage, as indicated by block 220. Once the operator identifies the location of the damage, a sector is selected for repair. This may involve a selection based upon perceived ease of repair, lowest common point to the datum, or such other criteria as the operation might apply, as indicated by block 222. The operator then goes through the repair and alignment process for the sector that was selected, as indicated by block 224. Embodiments of this will be described in more detail below. Once the sector is repaired, it must be determined whether or not all of the damaged sectors have been repaired, as indicated by decision block 226. If there is another sector that requires repair, the No path 228 is taken and another sector is selected for repair. If all of the visibly damaged sectors have been repaired, a determination is made as whether or not there are any undamaged sectors, as indicated by decision element 230. If there are none, the No path 232 is taken and the process is Done. If there is one or more undamaged sector, it is necessary to determine whether or not alignment of the sector will be done, as indicated by decision element 234. If the operator decides that alignment will not be done, the No path 236 is taken and the repair process is Done. If it is decided that alignment should be checked, the Yes path is taken to do the alignment check of the sector, as indicated by block 238. The alignment check process will be described in more detail below, but in general involves comparison of measured centerline measurements against the specified centerline measurements for various reference points, and noting when and where inequalities occur, thereby indicating that a portion of the sector being checked is out of alignment. When the alignment verification data is available, a decision is made as to whether or not corrective or further repair is required, as indicated by decision element 240. If deviations are sufficient to warrant repair, the Yes path 246 is taken, and steps are taken to correct the alignment 244; and, upon completion, the process returns to determine whether or not there are any remaining undamaged sectors. When it is determined that no corrective action will be taken relative the alignment of the sector, the process determines whether or not it is done, as indicated by decision element 246. When not done, the process proceeds to evaluate another sector. From the foregoing, then, it can be seen that dividing the vehicle into sectors provides a means for focusing the repair while maintaining awareness of the requirements to validate alignment. It should be understood, however, that the repair process could also be utilized without resorting to defining sectors of the vehicle.

Figure 17:
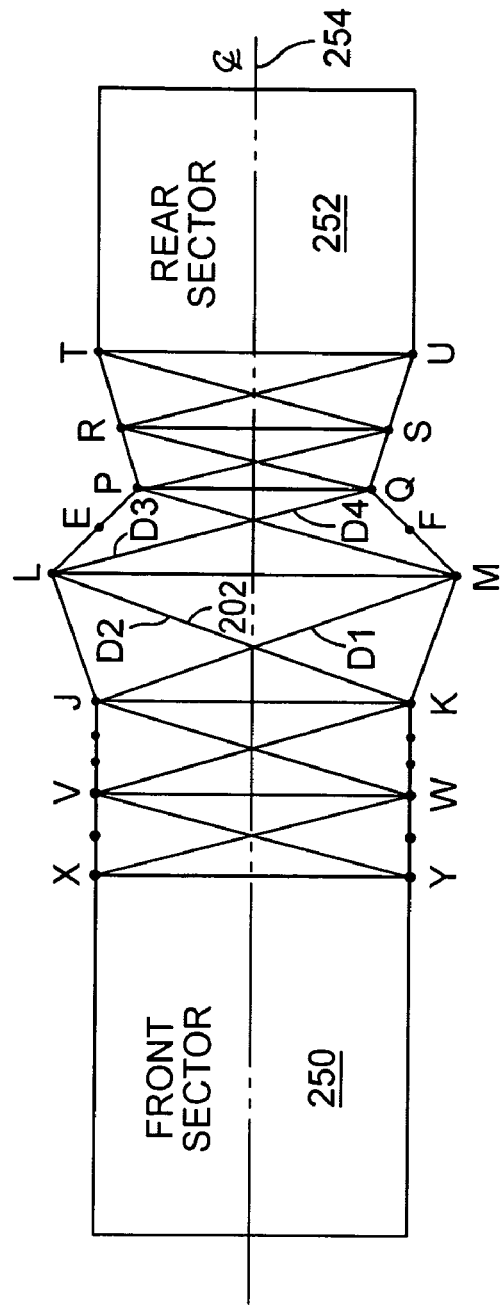
FIG. 17 is a diagrammatic view of a slice of a vehicle showing the incremental progression of repair of one embodiment of the repair process of the invention.

FIG. 17 is a diagrammatic view of a slice of a vehicle showing the incremental progression of repair of one embodiment of the repair process of the invention. This diagram illustrates a front sector 250, a rear sector 252, and a passenger sector defined by corner points X, T, U, and Y. The centerline CL is labeled 254. The discussion of this embodiment of the invention relates to the discussion and illustrations presented above with respect to FIG. 12, FIG. 13, and FIG. 14 and will describe the sequential incremental repair process. For this discussion, the vertical positional measurements and adjustments of the various reference points will be assumed to be satisfied by application of suitable pulling and/or pushing forces along force vector lines, as described in FIG. 11, along with the requisite holding functions, as the progression of steps is described. The preferred process is to start the evaluation and repair process at the lowest part of the vehicle and progress upward.

The repair process has been selected to start with points J, K, L and M and they have been respectively measured and have been brought into their respective positional measurement locations and have been held. In these positions the positional measurements can be measured and verified. That is the specified lengths of JL and KM can be measured and verified. The positions of J and K can be measured with respect to each other and with respect to the centerline 254. Similarly, the positions of L and M can be measured with respect to each other and with respect to the centerline 254. When these points are properly returned to specified positions diagonal measurement D1 and D2 will be substantially equal and will intersect the centerline 254 at point 202. As previously described, if diagonals D1 and D2 do not intersect the centerline, the section being repaired is out of alignment and further corrections utilizing measurements from the reference points to the centerline 254 will be required to bring this section into alignment.

When the initial section JKLM has been repaired, a new section LMPQ is selected for repair. The same operations occur and when the positional measurements LP, PQ, QM and ML are within specification the diagonals D3 and D4 will be of equal length and will intersect the centerline 254. For this repair section it will be noted that reference point E is between points L and P, and point F is between reference points M and Q. This is to illustrate that, depending upon the nature of the damage, it may not be necessary to measure and hold every reference point. In this case if the structure is such repairing reference points L and P is likely to bring E into proper specification, specific gripping, correction and holding of E may be omitted. It should be noted, however, that such an action might result in the alignment measurement of point E to the centerline still being out of specification, and would then be necessary to determine whether the misalignment would be sufficient to require further repair.

When repair section LMPQ has been repaired, a new repair section PRSQ is established and the repair process repeated. When repair section RTUS is addressed and repaired, the repair to the rearward portion of the passenger sector has been completed. While the repair could then extend into the rear sector 252, in one embodiment of the invention the next repair section would be selected as JKWV. Again note that there are unidentified reference points between V and J, and between W and K that would be subject to the same comments as made above relative to points E and F.

Once repair section JKWV is repaired the final repair section VWYX is addressed; and, when repaired, the lower level of the passenger sector has been repaired and aligned.

For unibody structures it is likely that additional slices similar to that just described, will be established at higher levels in the structure, while tying to reference points that have been repaired and held in the lower levels, and the process repeated.

Figure 18:
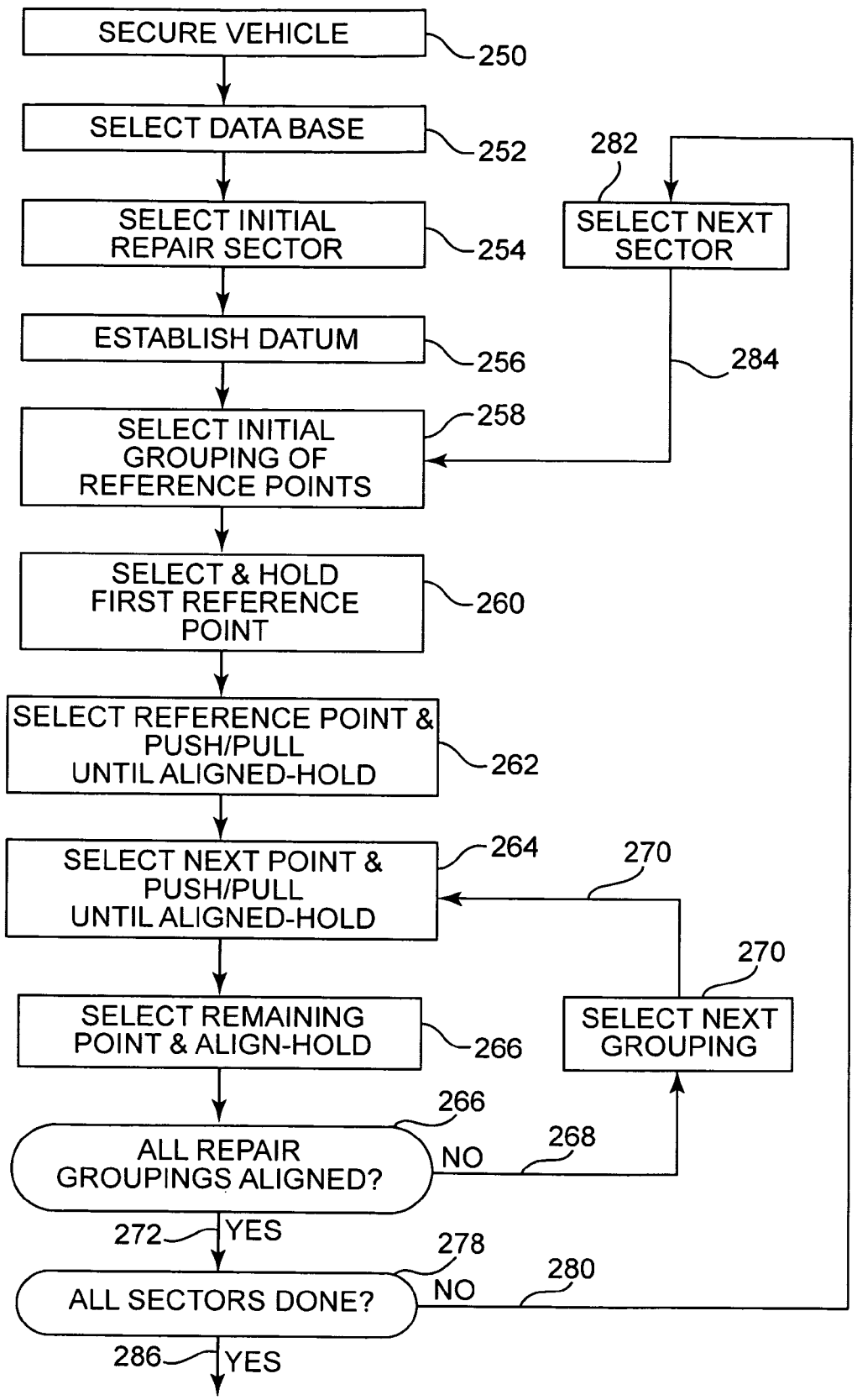
FIG. 18 is a flow diagram of an embodiment of the process of vehicle repair within sectors of the vehicle based upon consecutive repair of the reference points.

FIG. 18 is a flow diagram of an embodiment of the process of vehicle repair within sectors of the vehicle based upon consecutive repair of the reference points. In this embodiment, the process starts with securing the vehicle 250 and selecting a database for the vehicle 252. A sector of the vehicle is selected 254 based upon various criteria as discussed above. Once the datum is established 256, and initial grouping of reference points is selected 258. This selection generally involves reference points that are at the lowest point in the selected sector. Once the initial grouping is selected, a first reference point is selected and held 260. The next reference point is selected and either pushed or pulled until it is in its specified position and is held there 262. The selection can involve various criteria, but it is quite often selected as the diagonal reference point to the initial reference point in the initial grouping. The next process step is then to select the next reference point and push or pull it until it is in its specified position and is held there 264. Finally, the last reference point in the original grouping is selected and is pushed or pulled until it is in its specified position and is held 266. When the initial grouping of reference points has been repaired, it is determined as to whether or not all of the reference points in the selected sector have been processed, as indicated by decision element 266. If there are remaining reference points, the No path 268 is taken and a selection of the next repair grouping 270 is made. Again, there are a variety of criteria for making this selection, as discussed above, but it generally involves selecting two additional reference points that have some predetermined relationship with two of the reference points in the previous grouping. When this selection is made, the process returns 270 processing the next reference point 264. When all repair groupings within the selected sector have been repaired, the Yes path 272 is taken and it is determined whether or not all sectors have been repaired 278. In the event there are one or more sectors remaining, the No path 280 will be taken to select the next sector 282 for processing and return via path 284 to start the process over. When all of the sectors have been repaired the Yes path 286 indicates that the repair process has been completed.

Figure 19:
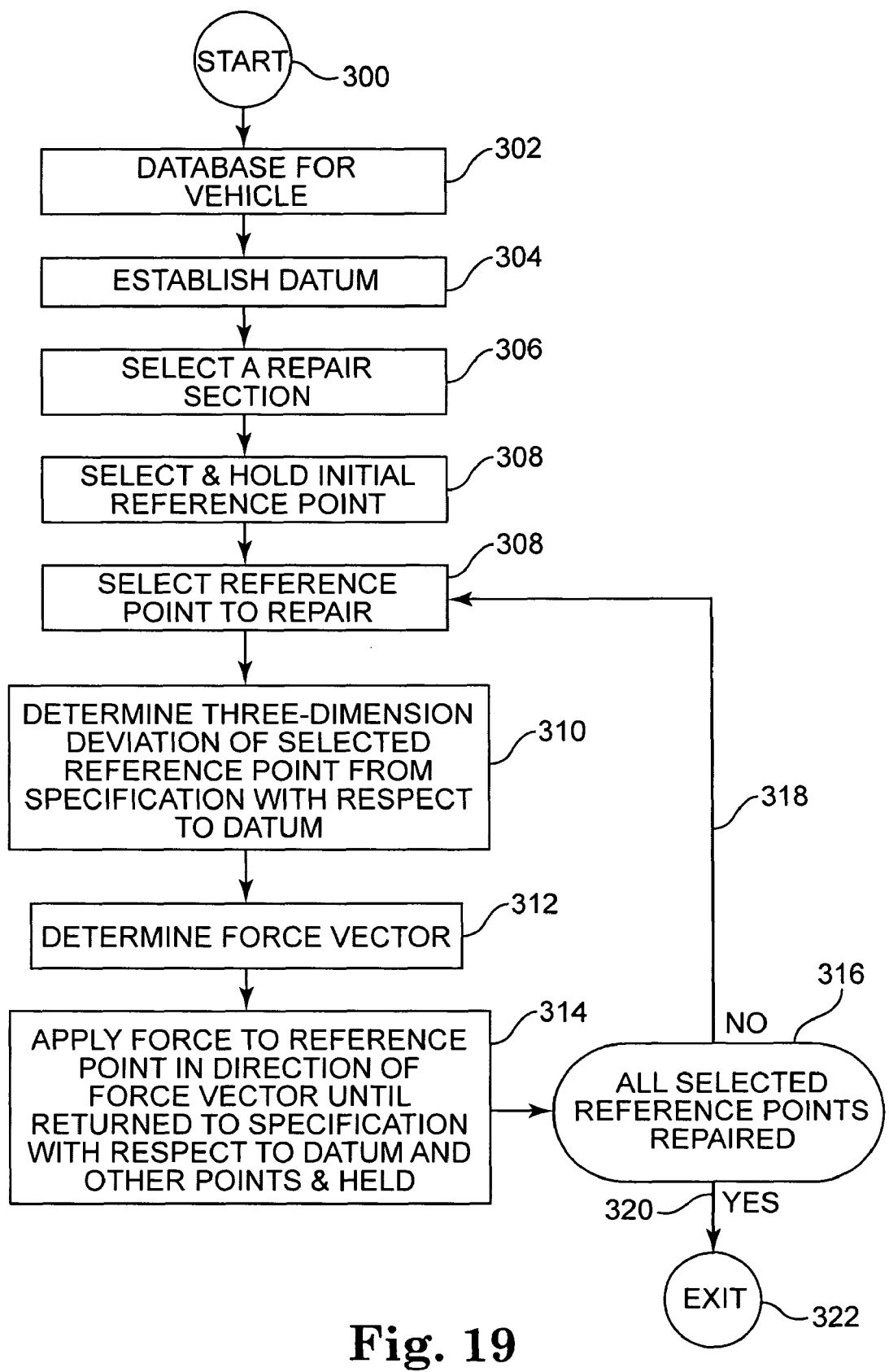
FIG. 19 is a flow diagram of an embodiment of the vehicle repair system based upon incremental sequential repair of reference points.

FIG. 19 is a flow diagram of an embodiment of the vehicle repair system based upon incremental sequential repair of reference points. This embodiment can be utilized with vehicles that are not to be repaired in sectors or within a sector or continuously for multiple sectors. At the Start 300 a database for the vehicle 302 is established and a datum is established 304. As previously described the datum can be a physical reference plane or can be a virtual plane of reference. A repair section is selected 306 and an initial reference point is selected and held 308. As previously described, there are various criteria that can be applied to selection of the starting repair section, but it is generally preferable to start at the lowest level of the vehicle and then proceed forwardly and backwardly and upwardly to sequence the repair operations. A reference point is selected 308 and a determination is made on a three-dimensional basis of the deviation of the selected reference point from specification with respect to the datum 310. The determination of the three-dimensional dislocation is generally done by making measurements relative the datum. The measurement can be accomplished by any means that has the degree of accuracy to be within the tolerances of the specification, including, but not limited to steel tape, jig fixture, electronic direct, electronic spatial, or the like. From the measurements provided, a force vector is determined 312. The force vector defines the three-dimensional direction for the application of the pulling or pushing force that is to be applied to the reference point being repaired. A force is then applied to the reference point in the direction of the force vector until it is returned to specification with respect to the datum and with respect to other associated reference points and is held 314. As described above, the determination of compliance with specification can involve the positional measurements with respect to the datum, the relational measurements with respect to related reference points, the diagonal measurements relative to alignment, and the centerline measurements relative to alignment. Once a reference point is repaired, a determination is made as to whether or not all of the reference points have been repaired 316. If not, the No path 318 is taken and the next reference point is selected for repair and the process just described is repeated. If all points have been repaired the Yes path 320 is taken and the repair process is completed at Exit 322.

Figure 20:
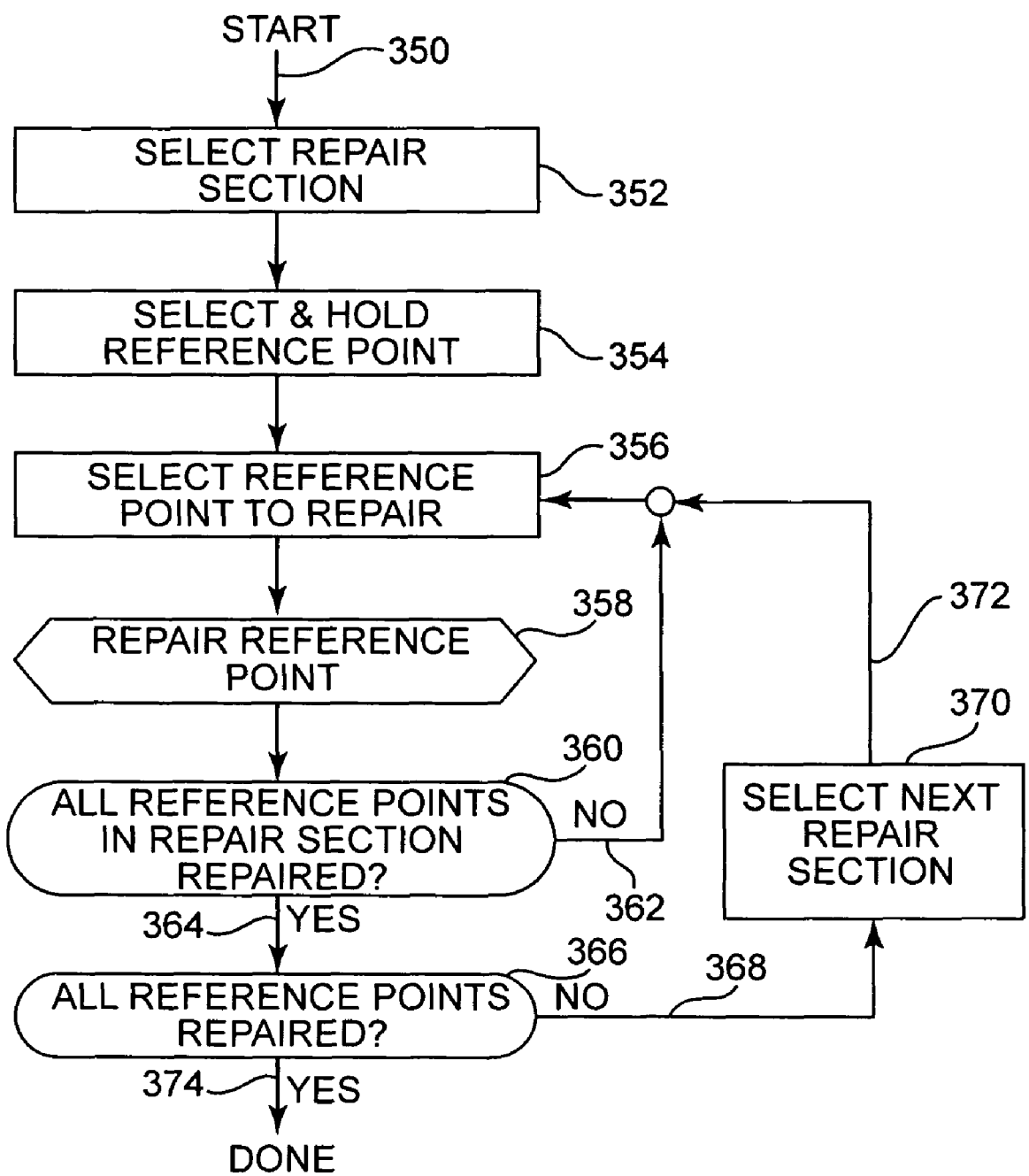
FIG. 20 is a flow diagram of an embodiment of the vehicle repair system.

FIG. 20 is a flow diagram of an embodiment of the vehicle repair system. This embodiment can also be utilized in the repair of vehicles that are to be repaired on a unitary basis, within sectors a vehicle, or incrementally across sectors. At the Start 350 a repair section is selected 352 and an initial reference point is selected and held 354. Again, it is preferable to start at the lowest portion of the vehicle. Once the initial reference point is established a reference point is selected for repair 356. The process to repair the reference point 358 is a subprocess that can have different embodiments. Illustrative embodiments will be described below with reference to FIG. 21 and FIG. 22. Once the reference point has been repaired in accordance with a selected repair process, a determination 360 is made as to whether or not all of the reference points in a repair section have been repaired. When not all of the points have been repaired, the No path 362 is taken, and another reference point is selected for repair 356. When all of the reference points have been repaired, the Yes path 364 is taken and a determination 366 is made to determine whether or not all of the reference points have been repaired. When not all points have been repaired, the No path 368 is taken and the next repair section is selected 370, and the process continues via path 372. When all of the reference points have been repaired, the Yes path 374 is taken and the repair operation is Done.

Figure 21:
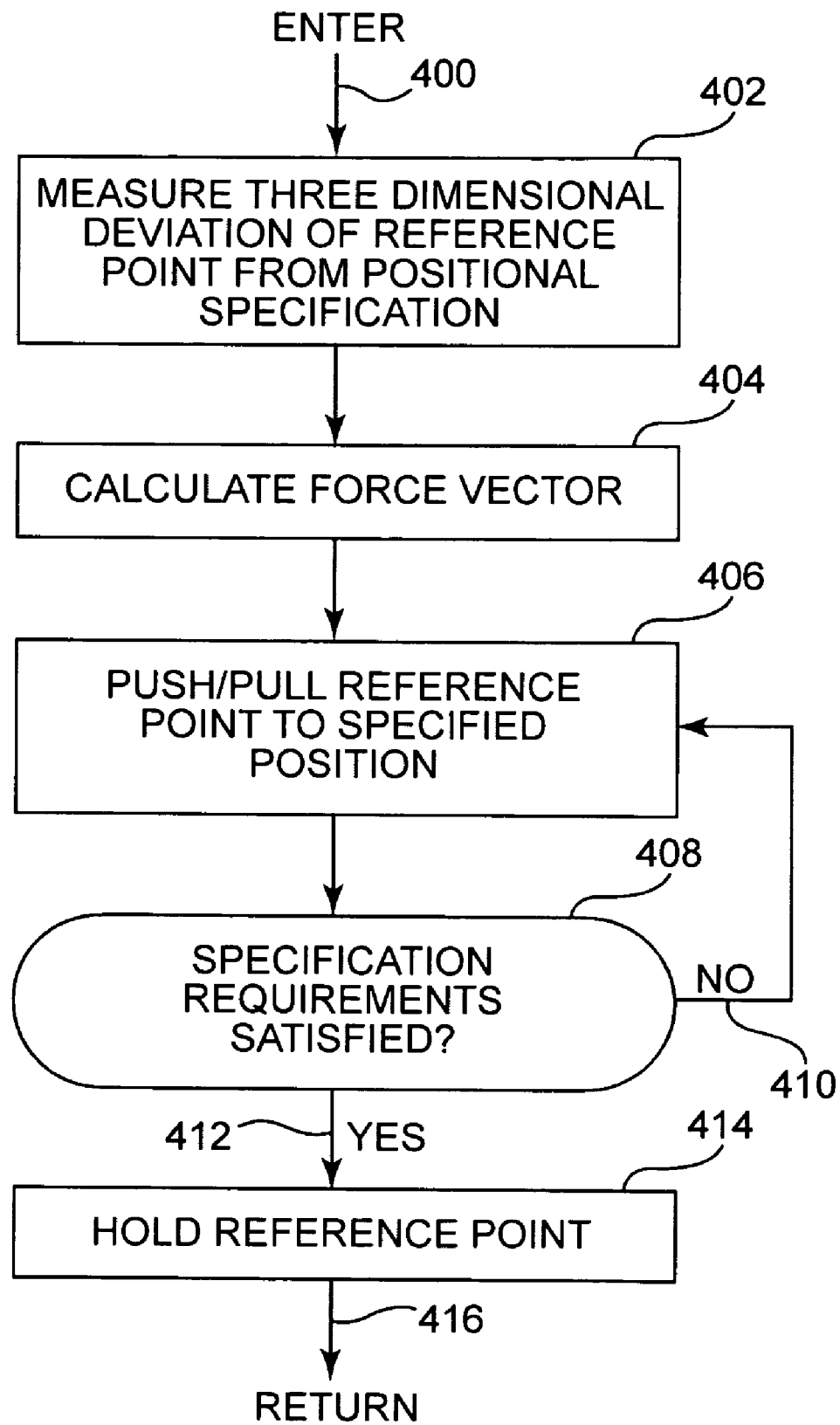
FIG. 21 is a flow diagram of an embodiment of the repair process utilized in the system shown in FIG. 20.

FIG. 21 is a flow diagram of an embodiment of the repair process utilized in the system shown in FIG. 20. This process is entered from the control process described with regard to FIG. 20, and is entered at line 400. The initial operation is to measure the three-dimensional deviation of the reference point from its positional specification, as indicated by block 402. As described above, measurements are taken in the x-axis, y-axis and z-axis to define the deviation. Once these measurements are available, a force vector is calculated 404. The force vector defines the three-dimensional direction of force that is to be applied. Once the force direction is determined, the reference point is pushed or pulled until it is brought within its specified position 406. This operation will deal primarily with positional measurements for purposes of returning the reference point to its specified position. As will be described below, it may be necessary to apply relational measurements, diagonal measurements and/or centerline measurements, depending upon the requirements for alignment. This involvement of the various types of measurements will depend upon the scope of the repair being done. These factors will be involved in the determination 408 of whether or not the reference point meets its specification requirements. If not, the No path 410 is taken and the pulling or pushing forces are again applied in a manner to correct the measured deviation from specification. If it is determined that the reference point is within specification, the Yes path 412 is taken and the reference point is held, as indicated by block 414. At that juncture, the subprocess is completed and the process is returned via line 416 to control process.

Figure 22:
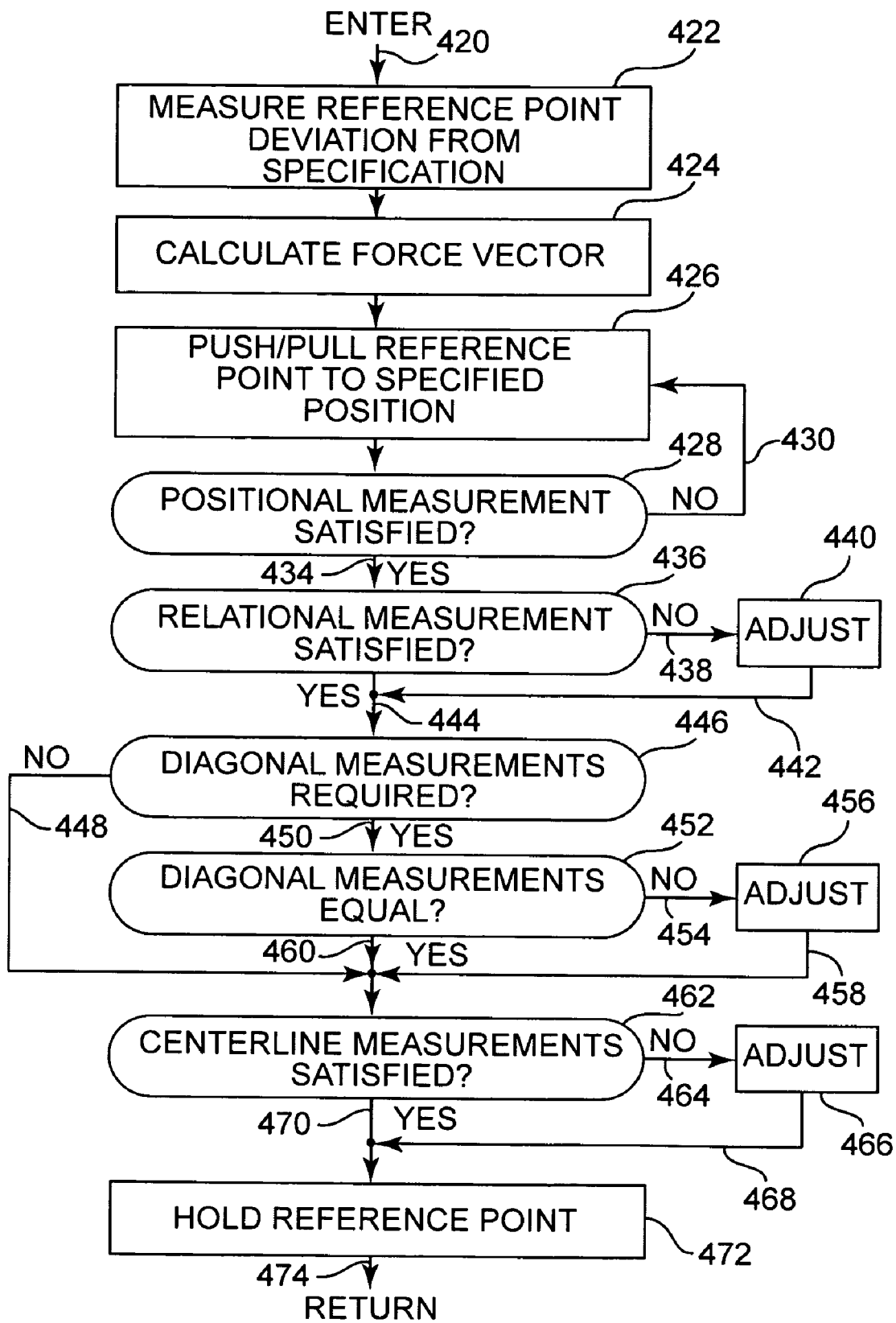
FIG. 22 is a flow diagram of another embodiment of the repair process utilized in the system shown in FIG. 20.

FIG. 22 is a flow diagram of another embodiment of the repair process utilized in the system shown in FIG. 20. This alternative embodiment is also entered from the control process described with regard to FIG. 20, and is entered at line 420. The initial operation is to measure deviation of the reference point from specification 422. These measurements are characteristically three-dimensional including x-axis, y-axis and z-axis components, as described above. Once the deviation measurements are completed, a force vector is calculated 424 to define three-dimensional trajectory of application of force. The reference point is then subjected to either a pulling force or pushing force to move it to its specified position, as indicated by block 426. A determination 428 is then made to determine whether or not the positional measurements for correct positioning have been satisfied. If not, the No path 430 returns the process to again apply force to position the reference point to its specified position. When it is correctly position, the Yes path 434 is taken, and a determination 436 is made as to whether or not relational measurements to one or more associated other reference points is or are satisfied. If not, the No path 438 is taken and adjustments 440 are made to correct any deficiencies and returns to the process via line 442. When the relational measurements are satisfied, the Yes path 444 is taken, and a determination 446 is made as to whether or not an evaluation of diagonal measurements is required. This determination will depend upon which reference point is being adjusted within the grouping or reference points. If not required, the No path 448 moves the process to the next step. If diagonal measurements are required, the Yes path 450 moves the process to a determination 452 as to whether or not associated diagonal measurements are equal. It will be recalled that unequal diagonal measurements indicate that there is misalignment. If it is determined that the diagonal measurements are not substantially equal, the No path 454 is taken and the reference point is adjusted 456 to meet the requirements, and returns to the process via line 458. When the diagonal measurements are substantially equal, the Yes path 460 is taken. The next step is to make a determination 462 as to whether or not the centerline measurements are satisfied, thereby determining the state of alignment. If not, the No path 464 is taken and the point is adjusted 466, and then moves via line 468 back to the process. When the centerline measurements substantially meet specification, the Yes path 470 is taken, and steps are taken to hold the reference point 472. At that juncture, the subprocess is completed and the operation returns via line 474 to the control process. It will of course be understood that the ordering and scope of the various determination may vary without departing from the scope of the embodiment of the invention.

Automated Repair Process

Figure 23:
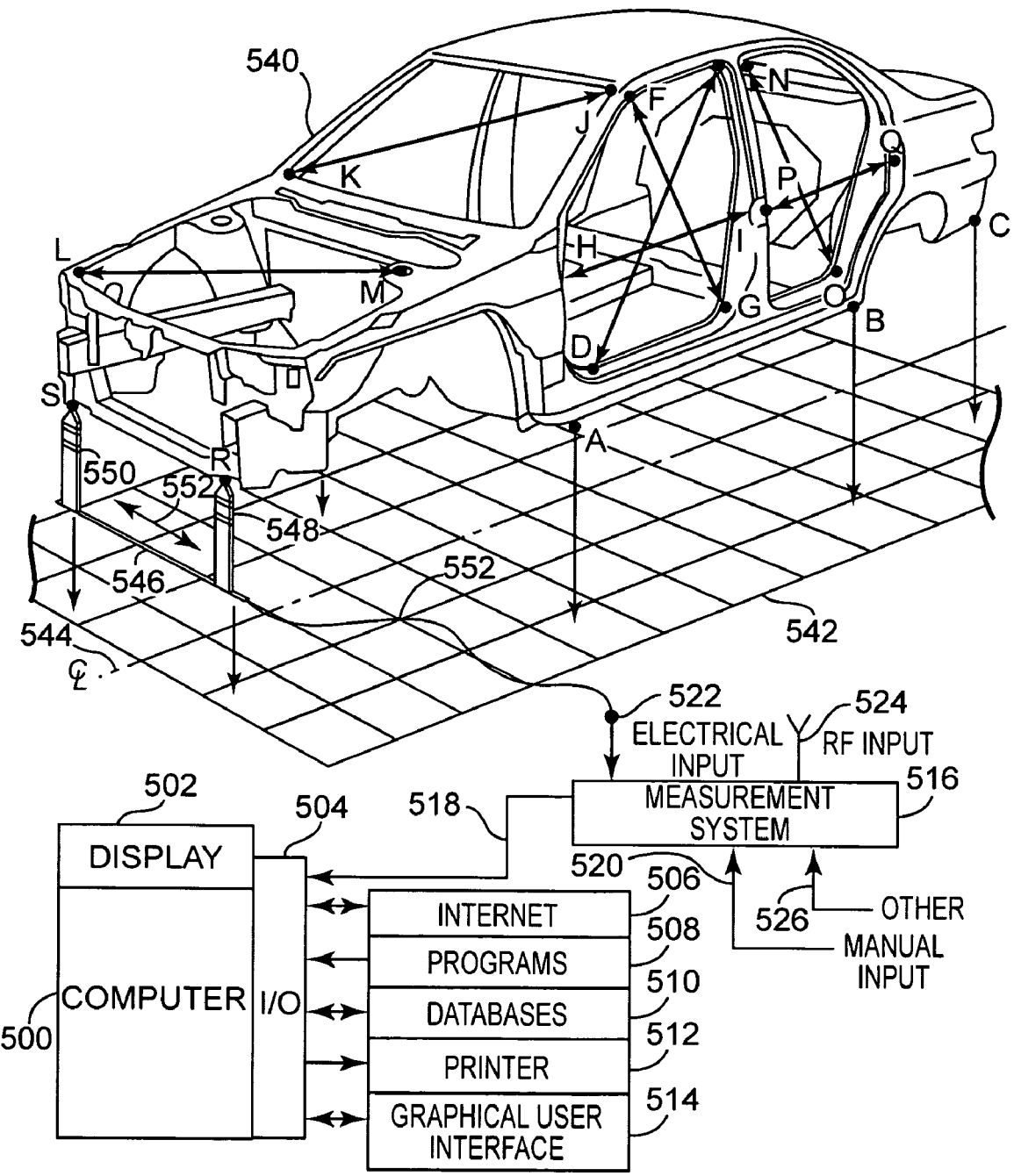
FIG. 23 is a block diagram of a computer system implementing a vehicle repair system.

FIG. 23 is a block diagram of a computer system implementing a vehicle repair system. An embodiment of the invention utilizes a Computer 500 that can be one of several available commercially. It is preferably a general purpose programmable system having sufficient memory capacity and operating speed to process multiple databases and execute control programs that perform the various data manipulations, measurement analysis, and control functions to perform vehicle repair.

The computer 500 requires a Display 502 for providing visual display of output from the operational programs. An Input/Output (I/O) section 504 processes input signals and provides output signals to and from Computer 500.

A number of input and output structures are coupled to I/O 504. In this embodiment a source of Internet connection 506 to provide a mechanism for downloading vehicle specification databases to Computer 502 from available on-line sources, as they may be required, for use in repairing specific vehicle types.

A repository of Programs 508 is required to store and provide the control programs for performing the repair evaluation, force vector calculations, the various measurement manipulations and analysis, and output repair data, of the type described above in the various embodiments. This repository of Programs 508 can be any of the known systems (not shown), such provided via magnetic tape, compact disc, or the like.

A source Databases 510 for storing specifications of various vehicle types is provided. The various types of equipment for providing databases are known, and can include various types of magnetic memory systems, compact disc system, or the like. The databases can be read as required into Computer 502 for each vehicle selected for repair, or can be read into Computer 502 and stored in the internal memory of Computer 502.

Printer 512 is provided to allow printouts of directions for repair, measurement data, repair reports, and such other output as may be required from time-to-time.

A Graphical User Interface (GIF) 514 is provided to allow automated visual representations, including but not limited, to animated or pictorial views of various aspects of the repair process as it may be projected or as it is actually occurring.

A Measurement System 516 is arranged to receive measurement input from a variety of sources and provide the required formatting for input to Computer 500 via line 518. The measurement input data can come from several different types of sources that can include Manual Input 520, Electrical Input 522, Radio Frequency (RF) 522, or such Other 526 input as may be required. These various inputs of measurements can be utilized exclusively, but in most cases they will be used in various combinations.

To illustrate the interaction of the computer system in a repair setting, Vehicle 540 is shown suspended above Datum 542 and positioned along Centerline (CL) 544. There are various measurement systems, some of which will be described below, that can be utilized to make measurements of the extent of damage at the various reference points, as well as in determining when a reference point has been returned its specified position.

A known form of making measurements includes a measurement structure 546, or alternatively a jig fixture, that has Upright Elements 548 and 550 arranged to contact designated reference points. Elements 548 and 550 are extendable, as by hydraulics, screw structure, or the like, and are adapted to provide electrical signals indicative of the height of each of the Upright Elements. It can be seen, then, that when the associated reference points are displaced, the extensions of the Upright Elements will measure their respective displacement. The measurements from Upright Elements 548 and 550 are transmitted via electrical line 552 to the Electrical Input terminal 522 of the Measurement System 516. As an example, if it is assumed that the reference point associated with Upright Element 548 is damaged and displaced upwardly, the measurement element will extend upwardly and measure the amount of displacement. This measurement will be transmitted to Computer 500 via the Measurement System, where the calculations to govern the repair will be made and provided to an operator. When a repair takes place, Upright Element 548 will be retracted and measure the return of the reference point to its specified position. To measure and repair other reference points one or more different jigs (not shown) will be positioned to associated reference points and the repair processes repeated. While jig fixtures are very functional with respect to close-tolerance measurement of vertical distances, the operation becomes more difficult when the reference point is displaced laterally. To accommodate the displacement, either or both Upright Elements 548 and 550 will require positioning in the directions of arrow 552 to make the original displacement measurement and again after the corrective action is taken, to measure the final position for compliance with the specification. It is of course apparent that the jig measurement system works from the bottom up, which is the preferred direction of repair in the various embodiments of the invention, but that in the unibody structure there will be reference points that are inaccessible to jig-type measuring such that some other form of measurement system must be utilized to evaluate and repair those reference points.

A more basic form of making measurements is via a hand held measuring device, such as a steel tape (not shown), or similar manual measurement device. The system of measurement will be selected where the scale is graduated in either inches or centimeters, and having sufficient scale sub-graduation to allow measurement to the required tolerances. The requisite measurements are provided through a known input device (not shown) such as a keyboard or the like, via line 520 to the Measurement System 516 for entry into Computer 500.

There are other systems for making measurements (not shown), such as laser positioning, or the like, that can be employed. These may be limited to line-of-sight functionality and may require other forms of measurement for those reference points not visible from the periphery of the vehicle. Such other forms of developing measurements will provide input via line 526 to the Measurement System 516 for entry in Computer 502.

Another system for making measurements in a vehicle repair system includes the use of a plurality of transmitters (not shown) that can transmit at radio frequency (RF) and can be adapted to be individually identifiable. The identification can be by transmission of device-specific coded signals, or such other type of transmission used by the system. This type of RF transmitter will be self-powered in most cases. In operation a transmitter will be located at each of the reference points for which repair may be required or for which specification evaluation will be required. For example, a RF device would be affixed to selected locations on vehicle body 540, shown as the dots identified at locations A through S where each will transmit is particular signal. The transmitted signals will be provided at RF Input 524 to the Measurement System 524, where a detector (not shown) will determine which transmitter signal will be utilized based upon positional requirement for a particular reference point is established by Computer 502. The three-dimensional measurement of the position of the selected reference point will be determined based on the signal of the associated transmitter for the selected reference point and the measurement information will be sent to Computer 502. It will be apparent, then, that the various RF devices can be utilized during analysis of the damage, during repair of the damage, and in the final verification of compliance with the specifications for the various reference points. The ability to have on-going three-dimensional measurement data available based upon changes in position of the various reference points as repairs are made will be of significant advantage in providing a repair system that is either partially or fully automated. From the drawings and the foregoing descriptions of the preferred embodiments, it can be seen that the purposes and advantages of the preferred embodiments of the invention have been achieved. Various modification and extensions may become apparent to those skilled in the art within the spirit and scope of the invention. Accordingly, what is intended to be protected by Letters Patent is set forth in the appended Claims.

What I claim is set forth in the appended claims:

1. A method for repairing a damaged vehicle on a repair rack comprising:
   a. selecting a specification database for the vehicle type to be repaired, wherein the database establishes positional measurements for a plurality of reference points for the selected vehicle;
   b. establishing a datum;
   c. selecting and holding on the rack an initial reference point on the vehicle with respect to the datum;
   d. selecting a next reference point on the vehicle to be repaired;
   e. determining the deviation of the selected reference point from its specified position and establishing the deviation by three-dimensional measurements with respect to the datum;
   f. calculating a force vector for defining the direction of force to be applied to the reference point to cause the reference point to be moved to its specified position;
   g. applying force to the reference point in the direction of the force vector to cause the reference point to move in the direction of the force vector;
   h. establishing when the reference point is returned to its specified position and discontinuing the application of force;
   i. holding the reference point at that specified position;
   j. identifying the optimal next reference point to be repaired; and
   k. repeating steps d through k for each of the plurality of reference points on the damaged vehicle that require repair,
   whereby the repair of the vehicle is optimized and collateral vehicle damage to the vehicle caused by each application of force to a selected reference point is minimized.

2. The method of claim 1 wherein the specified positional measurements for the plurality of reference points includes:
   a. datum measurements for each of the reference points from a datum;
   b. separation measurements of ones of the plurality of reference points with respect to associated related other ones of the plurality of reference points; and
   c. centerline measurements of selected ones of the plurality of reference points from the centerline of the vehicle.

3. The method of claim 2 wherein the step of establishing includes the steps of:
  a. measuring the datum height of the reference point and comparing it to the specified datum height and determining when the measured datum height and the specified datum height are substantially equal;
  b. measuring the separation distance of the reference point from a related reference point and comparing it to the specified separation distance and determining when the measured separation distance and the specified separation distance are substantially equal; and
  c. measuring the centerline distance of the reference point to the centerline, when applicable, and comparing it to the specified centerline distance and determining when the measured centerline distance and the specified centerline distance are substantially equal.

4. The method of claim 3, wherein the steps to accomplish the steps of determining, calculating and establishing are computer implemented utilizing software applications running on a programmable computer system, responsive to the specification database, wherein the computer system includes an input and output system for receiving input signals and output signals, respectively, as measurement signals are provided.

5. A computer implemented system for repairing a damaged vehicle utilizing a repair rack to secure the vehicle and for use in establishing a datum for the damaged vehicle relative to the repair rack comprising:
  database-selecting means for selecting a specification database for the vehicle type to be repaired, wherein the database establishes positional measurements for a plurality of reference points for the selected vehicle;
  datum-establishing means for establishing a datum;
  first selecting means for selecting an initial reference point with respect to the datum;
  second selecting means for selecting a reference point to be repaired;
  deviation-determining means for determining the deviation of the selected reference point from its specified position and establishing the deviation by three-dimensional measurements with respect to the datum;
  calculating means for calculating a force vector for defining the direction of force to be applied to the reference point to cause the reference point to be moved to its specified position;
  controlling means for controlling the application of force to the reference point in the direction of the force vector;
  positional-establishing means for establishing when the reference point is returned to its specified position and discontinuing the application of force;
  holding means for holding the selected reference point at its specified position; and
  repeating means for repeating the repair process for each of the plurality of reference point on the damaged vehicle that require repair.

6. The system of claim 5 wherein the specified positional measurements for the plurality of reference points each include:
  datum measurements for each of the reference points from the datum immediately prior to starting repair of each of the reference points;
  relational measurements of ones of the plurality of reference points with respect to associated related other ones of the plurality of reference points; and
  centerline measurements of selected ones of the plurality of reference points from the centerline of the vehicle.

7. The system of claim 6 wherein the deviation-determining means includes:
  datum-height measuring means for measuring the datum height of the reference point prior to being repaired;
  comparing means for comparing the datum height to the specified datum height;
  datum-height comparing means for determining when the measured datum height and the specified datum height are substantially equal;
  relational-measuring means for measuring the separation distance of the reference point from a related reference point and including relational comparing means for comparing the measured relational distance to the specified separation distance and determining when the measured separation distance and the specified separation distance are substantially equal; and
  centerline-measuring means for measuring the centerline distance of the reference point to the centerline, when applicable, and including centerline comparing means for comparing measured centerline distance to the specified centerline distance and determining when the measured centerline distance and the specified centerline distance are substantially equal.

8. For use in a vehicle repair system for repairing a damaged vehicle utilizing a repair rack and a datum for the damaged vehicle relative to the repair rack, a computer implemented method comprising:
  a. identifying a reference point on a vehicle on the repair rack requiring repair relative to the datum;
  b. determining the three-dimensional damaged position of the selected reference point position relative to its specified positional measurements with respect to the datum;
  c. calculating a force vector for establishing the optimum direction of application of force to move the reference point to its specified positional measurements;
  d. applying force to the reference point in the direction of the force vector until the reference point is returned to its specified position relative to the datum;
  e. holding the reference point; and
  f. selecting an optimal next reference point to be repaired;
  whereby the minimal amount of force will be required to return the reference point to its specified positional measurements while causing minimal collateral damage to the vehicle during the repair of the reference point.

9. The computer implemented method of claim 8, wherein
  a. the step of determining includes measuring the deviations in the x-axis, y-axis and z-axis of the damaged position of the reference point with respect its positional specification with respect to the datum; and
  b. the step of calculating includes calculating the slope of a vector originating at the damaged position and passing through the specified position of the reference point.

10. For use in a vehicle repair system utilizing a repair rack for mounting the vehicle to be repaired and establishing a datum for use in the repairs, a computer implemented process for repairing each damaged reference point on the vehicle comprising:
  a. identifying a reference point on a vehicle held on the repair rack requiring repair relative to the datum;
  b. determining the three-dimensional damaged position of the selected reference point position relative to its specified positional measurements with respect to a datum;
  c. calculating a force vector for establishing the optimum direction of application of force to move the reference point to its specified positional measurements; and d. applying force in the direction of the force vector until the reference point is returned to its specified position and holding the reference point as necessary, whereby the minimal amount of force will be required to return the reference point to its specified positional measurements while causing minimal collateral damage to the vehicle during the repair of the reference point.

11. The computer implemented process of claim 10, wherein
   a. the step of determining includes measuring the deviations in the x-axis, y-axis and z-axis of the damaged position of the reference point with respect its positional specification with respect to the datum; and
   b. the step of calculating includes calculating the slope of a vector originating at the damaged position and passing through the specified position of the reference point.

12. For use in a vehicle repair system for repairing a damaged vehicle utilizing a repair rack, the computer implemented method comprising:
   a. selecting the sector of a vehicle needing repair of the structure;
   b. repairing the structure of the selected sector by bringing the body reference points into specification and validating alignment of the structure in the repaired sector and holding selected reference points in repaired positions;
   c. repeating steps 'a' and 'b' for all damaged sectors of the vehicle;
   d. determining whether there is any undamaged sector, including determining whether it is necessary to check alignment of any undamaged sector;
   e. checking alignment of the sector by determining whether any reference point is out of tolerance with respect to alignment;
   f. determining whether further alignment repair is required and when necessary making alignment repair; and
   g. continuing steps 'e' and 'f' until all undamaged sectors are determined to be within tolerance with respect to alignment, wherein the step of repairing for each dislocated reference point within the sector, includes the steps of:
   measuring the three-dimensional deviation of the reference point from its positional specification requirements;
   calculating a force vector to direct direction of force application at the reference point;
   applying force in the direction of the force vector until the reference point is returned to its positional specification requirements;
   validating whether or not all specified positional requirements have been met within prescribed tolerances to assure repair to specification and alignment of the structure, and, if not met, making further repair until satisfied; and
   holding the reference point pending further repair activity.

13. The computer implemented method of claim 12, wherein the specified positional measurements for the plurality of reference points includes:
   a. datum measurements for each of the reference points from a datum established relative to the damaged vehicle on the repair rack;
   b. separation measurements of ones of the plurality of reference points with respect to associated related other ones of the plurality of reference points; and
   c. centerline measurements of selected ones of the plurality of reference points from the centerline of the vehicle.

14. The computer implemented method of claim 13, wherein validating includes the steps of:

a. measuring the datum height of the reference point after repair and comparing it to the specified datum height and determining when the measured datum height and the specified datum height are substantially equal;
b. measuring the separation distance of the reference point after repair from a related reference point and comparing it to the specified separation distance and determining when the measured separation distance and the specified separation distance are substantially equal; and
c. measuring the centerline distance of the reference point after repair to the centerline, when applicable, and comparing it to the specified centerline distance and determining when the measured centerline distance and the specified centerline distance are substantially equal.

15. The computer implemented method of claim 13, wherein validating alignment includes the steps of
   a. determining whether or not positional specification measurements are satisfied within a prescribed tolerance, and, if not making further repair until satisfied;
   b. determining whether or not relational specification measurements between related reference points are within prescribed tolerance, and, if not, making further repair until satisfied; and
   c. determining for each reference point, whether or not diagonal measurements between the reference point being validated and a related reference point are required, and when required, comparing the diagonal measurement to a diagonal measurement between two related reference points to determine whether or not the two diagonal measurements are substantially equal, and adjusting the structure until the diagonal measurements are substantially equal; and
   d. determining whether or not centerline specification measurements are satisfied within the prescribed tolerance, and, if not, adjusting the structure until satisfied,
   whereby positional and alignment requirements will be satisfied.

16. The computer implemented method of claim 15, wherein the determining and calculating steps are computer software implemented.

17. For use in a vehicle repair system utilizing a repair rack to mount the vehicle and to establish a datum for use in the repairs, the computer implemented method comprising:
   a. selecting a repair section initially including four related reference points symmetrically arranged in pairs when undamaged;
   b. selecting and holding a first reference point of a first pair;
   c. selecting a diagonal reference point in a second pair;
   d. repairing the diagonal reference point of the second pair to its specified positional measurements and holding it;
   e. repairing the second reference point of the first pair to its specified positional measurements and holding it;
   f. repairing the second reference point of the second pair to its specified positional measurements and holding it;
   h. establishing another repair section by selecting a further pair of reference points related to one or the other of the pairs of reference points that have been repaired;
   i. associating one of the further pair with the diagonal one of the selected related pair and associating the other diagonal one of the further pair to the other one of the selected pair;
   j. separately repairing each one of the further pair of reference points to its specified positional measurements and holding; and
   k. repeating steps 'f' through 'j' until all of the reference points that have been damaged have been repaired, whereby the repair is advanced in incremental steps in both directions from the first pair and minimizes the force required to achieve repair of each of the selected reference points.

18. The computer implemented method of claim 17, wherein each of the repairing steps utilizes the specified measurements for each of the reference points wherein the measurements include:
   a. datum measurements for each of the reference points from a datum;
   b. separation measurements of related ones of the reference points with respect to associated related other ones of the reference points;
   c. centerline measurements of selected ones of the reference points from the centerline of the vehicle; and
   d. diagonal measurements of selected pairs of reference points arranged in a repair section.

19. The computer implemented method of claim 18, wherein repairing includes the steps of:
   a. measuring the datum height of the reference point after repair and comparing it to the specified datum height and determining when the measured datum height and the specified datum height are substantially equal;
   b. measuring the separation distance of the reference point after repair from a related reference point and comparing it to the specified separation distance and determining when the measured separation distance and the specified separation distance are substantially equal;
   c. measuring the centerline distance of the reference point after repair to the centerline, when applicable, and comparing it to the specified centerline distance and determining when the measured centerline distance and the specified centerline distance are substantially equal; and
   d. measuring the diagonal distances after repair for pairs of reference points that are affiliated in the repairing process, when applicable, and comparing the sets of diagonal measurements to determine whether or not the compared diagonal measurements are substantially equal, whereby when the criteria of the specified measurements are satisfied, the reference points will be within specification and the vehicle will be aligned.

20. For use in a vehicle repair system utilizing a repair rack for mounting the vehicle and establishing a datum for use in the repair, a computer system comprising:
   a computer capable of executing programs and having an input and output system capable of receiving input signals and transmitting output signals;
   a display for providing visual display of data and commands;
   a printer for providing printed output of data and commands;
   a database source for providing specifications for selected vehicle types;
   a measurement system for receiving measurement signals from a plurality of sources and providing signals indicative of received measurement data to the computer in selected formats;
   programs operable on the computer capable of processing input data for—
   a. treating each reference point to be repaired by processing three-dimensional measurements indicative of the dislocation of the reference point from its specified position and determining a force vector to define the direction of application of force on the reference point to return it to its specified position as determined by the database;
   b. incrementally processing successive repair sections comprised of selected reference points by causing each reference point in the repair section to be brought into its specified position as determined by the database; and
   c. verifying that repaired reference points within a repair section have been repaired to positions that assure alignment of the vehicle being repaired as determined by the database;
   whereby upon completion of repair of all of the selected reference points, the vehicle body has been repaired and is in alignment.

21. The system of claim 20, wherein the specified positional measurements for each of the reference points includes:
   a. datum measurements for each of the reference points from a datum;
   b. separation measurements of ones of the reference points with respect to associated related other ones of the reference points; and
   c. centerline measurements of selected ones of the reference points from the centerline of the vehicle.

22. The system of claim 20, wherein the specified positional measurements for each of the reference points in selected pairs of reference points includes:
   a. datum measurements for each of the reference points from a datum;
   b. separation measurements of ones of the reference points with respect to associated related other ones of the reference points in the selected pairs of reference points; and
   c. centerline measurements of selected ones of the reference points from the centerline of the vehicle.

23. The system of claim 20 wherein the repair of each of the reference points includes the steps of:
   a. measuring the datum height of the reference point and comparing it to the specified datum height and determining when the measured datum height and the specified datum height are substantially equal;
   b. measuring the separation distance of the reference point from a related reference point and comparing it to the specified separation distance and determining when the measured separation distance and the specified separation distance are substantially equal; and
   c. measuring the centerline distance of the reference point to the centerline, when applicable, and comparing it to the specified centerline distance and determining when the measured centerline distance and the specified centerline distance are substantially equal.

* * * * *